US011228057B2

(12) United States Patent
Morizur et al.

(10) Patent No.: US 11,228,057 B2
(45) Date of Patent: Jan. 18, 2022

(54) COMPOUNDS BASED ON AN ELEMENT FROM THE BORON GROUP, AND USE THEREOF IN ELECTROLYTE COMPOSITIONS

(71) Applicant: SCE France, Lacq (FR)

(72) Inventors: Vincent Morizur, Pau (FR); Pauline Hays, Peyrehorade (FR); Arthur Delaboissiere, Merignac (FR); Julien Parvole, Pau (FR); Sabrina Paillet, Lescar (FR); Karim Zaghib, Longueuil (CA)

(73) Assignee: SCE FRANCE, Lacq (FR)

( * ) Notice: Subject to any disclaimer, the term of this patent is extended or adjusted under 35 U.S.C. 154(b) by 164 days.

(21) Appl. No.: 16/471,158

(22) PCT Filed: Dec. 22, 2017

(86) PCT No.: PCT/FR2017/053827
§ 371 (c)(1),
(2) Date: Jun. 19, 2019

(87) PCT Pub. No.: WO2018/115793
PCT Pub. Date: Jun. 28, 2018

(65) Prior Publication Data
US 2020/0028211 A1    Jan. 23, 2020

(30) Foreign Application Priority Data
Dec. 23, 2016 (CA) .................. CA 2953163

(51) Int. Cl.
*H01M 10/0567* (2010.01)
*C07F 5/00* (2006.01)
*C07F 5/02* (2006.01)
*C07F 5/05* (2006.01)
*H01M 10/0525* (2010.01)
*H01M 10/0568* (2010.01)

(52) U.S. Cl.
CPC ......... *H01M 10/0567* (2013.01); *C07F 5/003* (2013.01); *C07F 5/022* (2013.01); *C07F 5/05* (2013.01); *H01M 10/0525* (2013.01); *H01M 10/0568* (2013.01); *H01M 2300/0025* (2013.01)

(58) Field of Classification Search
CPC  C07F 5/003; C07F 5/022; C07F 5/05; H01M 10/052; H01M 10/0525; H01M 10/0567; H01M 10/0568
See application file for complete search history.

(56) References Cited
U.S. PATENT DOCUMENTS

| 3,267,154 A | 8/1966 | Hokama |
| 3,853,941 A * | 12/1974 | Hough ...................... C07F 5/04 558/296 |
| 5,084,586 A | 1/1992 | Farooq |
| 5,300,387 A | 4/1994 | Ong |
| 5,891,582 A * | 4/1999 | Ehrhart ............... C09D 167/07 428/482 |
| 6,207,845 B1 | 3/2001 | Okutsu et al. |
| 6,548,212 B1 | 4/2003 | Heider et al. |
| 2003/0073006 A1* | 4/2003 | Fujinami .......... H01M 10/0567 429/336 |
| 2003/0228524 A1 | 12/2003 | Heider et al. |
| 2010/0279155 A1 | 11/2010 | Scott et al. |
| 2015/0125761 A1 | 5/2015 | Shimamoto et al. |

FOREIGN PATENT DOCUMENTS

| CA | 2 284 359 A1 | 4/2000 |
| CN | 101882696 A * | 11/2010 |
| CN | 102424995 A | 4/2012 |
| EP | 2840639 A1 | 2/2015 |
| EP | 3059795 A1 | 8/2016 |
| JP | H04-214704 A | 8/1992 |
| JP | H04-256963 A | 9/1992 |
| JP | 2002-138092 A | 5/2002 |
| JP | 2003-303617 A | 10/2003 |
| JP | 2006-245041 A | 9/2006 |
| JP | 2013067601 A | 4/2013 |
| JP | 2014-194870 A | 10/2014 |
| WO | 98/42802 A1 | 10/1998 |
| WO | 98/50389 A1 | 11/1998 |
| WO | 01/99209 A2 | 12/2001 |
| WO | 2010/080505 A2 | 7/2010 |
| WO | 2013/168821 A1 | 11/2013 |

OTHER PUBLICATIONS www.espacenet.com machine translation of CN-101882696-A. (Year: 2010).*
International Search Report (PCT/ISA/210) dated May 9, 2018, by the European Patent Office as the International Searching Authority for International Application No. PCT/FR2017/053827.
Written Opinion (PCT/ISA/237) dated May 9, 2018, by the European Patent Office as the International Searching Authority for International Application No. PCT/FR2017/053827.
Barthel, J., et al., "A New Class of Electrochemically and Thermally Stable Lithium Salts for Lithium Battery Electrolytes", J. Electrochem. So., vol. 143, No. 11, Nov. 1996, pp. 3572-3575.

(Continued)

*Primary Examiner* — Gregg Cantelmo
(74) *Attorney, Agent, or Firm* — Buchanan Ingersoll & Rooney P.C.

(57) ABSTRACT

Compounds based on an element from Groupe IIIA (column 13) of the periodic table of the elements, such as boron, aluminum, gallium or indium, are here described, as well as their processes of preparation and their use as salts and/or additives, for instance, in combination with other salts in electrolyte compositions for electrochemical cells, inter alia, in electrolyte compositions in the presence of a liquid solvent and/or a solvating polymer, the electrolyte being in liquid, gel or solid form.

26 Claims, 4 Drawing Sheets

(56) References Cited

OTHER PUBLICATIONS

Freiberg, A., et al., "Anodic Decomposition of Trimethylboroxine as Additive for High Voltage Li-Ion Batteries", Journal of The Electrochemical Society, vol. 161, No. 14, 2014, pp. A2255-A2261.

Lee, H. S., et al., "The Synthesis of a New Family of Boron-Based Anion Receptors and the Study of Their Effect on Ion Pair Dissociation and Conductivity of Lithium Salts in Nonaqueous Solutions", Journal of the Electrochemical Society, vol. 145, No. 8, Jan. 1, 1988, pp. 2813-2818.

Nair, Nanditha G., et al., "Fluorinated Boroxin-Based Anion Receptors for Lithium Ion Batteries: Fluoride Anion Binding, Ab Initio Calculations, and Ionic Conductivity Studies", J. Phys. Chem., vol. 113, 2009, pp. 5918-5926.

Olah, George A., et al., "Boron, Aluminum, and Gallium Tris(trifluoromethanesulfonate) (Triflate): Effective New Friedel-Crafts Catalysts", Journal of the American Chemical Society, vol. 110, No. 8, Jan. 1, 1988, pp. 2560-2565.

Reddy, V. Prakash, et al., "Boron-based anion receptors in lithium-ion and metal-air batteries", Journal of Power Sources, vol. 247, Feb. 1, 2014, pp. 813-820.

Sharabi, R., et al., "Electrolyte solution for the improved cycling performance of LiCoPO4/C composite cathodes", Electrochemistry Communications, vol. 28, 2013, pp. 20-23.

So, Chau Ming, et al., "Rhodium-Catalyzed Asymmetric Hydroarylation of 3-Pyrrolines Giving 3-Arylpyrrolidines: Protonation as a Key Step", Journal of the American Chemical Society, vol. 135, 2013, pp. 10990-10993.

Wang, Xianshu, et al., "Improving cyclic stability of lithium cobalt oxide based lithium ion battery at high voltage by using trimethylboroxine as an electrolyte additive", Electrochimica Acta, vol. 173, 2015, pp. 804-811.

Official Action "Notice of Reasons for Refusal" and English-language translation, dated Aug. 18, 2021 in JP 2019-555073, 17 pages, Japan Patent Office, Tokyo, JP.

Eilmes, Andrzej, et al., "A quantum-chemical study on ion complexation in polymer electrolytes containing lithium aluminate salts," *Solid State Ionics*, 2009, vol. 180, 8 pages including pp. 934-940, Elsevier B.V., NL.

Deacon, G.B., et al., "The Thallation of Polyfluoroaromatic Compounds," *Journal of Fluorine Chemistry*, 1977, vol. 10, 6 pages including pp. 177-180, Elsevier Sequoia S.A., Lausanne—Printed in the Netherlands.

Nöth, Heinrich, et al., "Über Salze des Bis(diisopropylamino)bor (1+)-Kations," *Chemische Berichte*, vol. 119, 1986, 6 pages including pp. 2075-2079, vol. 119, VCH Verlagsgesellschaft mbH, Weinheim, DE.

\* cited by examiner

COMPOUNDS BASED ON AN ELEMENT FROM THE BORON GROUP, AND USE THEREOF IN ELECTROLYTE COMPOSITIONS

RELATED APPLICATION

The present application claims priority, under applicable law, to Canadian patent application No. 2,953,163 filed on Dec. 23, 2016, the content of which is incorporated herein by reference in its entirety and for all purposes.

TECHNICAL FIELD

The present application relates to compounds based on an element from the boron family, their preparation processes and their use as salts and/or additives in electrolyte compositions.

BACKGROUND

A lithium-ion battery includes a negative electrode, a positive electrode, a separator and an electrolyte. The negative electrode and the positive electrode consist of one or two active materials (lithium insertion and extraction), a mixture of electronic conductors, a polymer used to bind the particles together and to adhere to the current collector (usually aluminum or copper). The electrolyte consists of one or more lithium salts dissolved in a liquid solvent (usually a mixture of organic carbonates) or in a polymer solvent. Additives may be added to the electrolyte solution to improve the battery's resistance to temperature, high-voltage, aluminum corrosion, etc.

Lithium-ion batteries for electric cars and other electrical devices available today most often use liquid electrolytes based on lithium hexafluorophosphate ($LiPF_6$) in a mixture of carbonates. The popularity of this salt is mainly due to the formation of a passivation layer on aluminum (most used current collector for cathodes). However, $LiPF_6$ is thermally unstable but also chemically unstable since it can react with a protic species (e.g. $H_2O$, etc.) to form a toxic gas, very aggressive and undesirable, hydrogen fluoride (HF). Even if all precautions are taken to avoid contact of $LiPF_6$ with a protic species, a high risk exists, which involves degradation of the battery resulting in a reduced life and potential safety problems. In addition, the cost of this salt remains relatively high. These major disadvantages have encouraged research for salts replacing $LiPF_6$ with improved electrochemical, thermal, chemical properties and others.

Various salts have been proposed as candidates for replacing $LiPF_6$. These salts nevertheless have disadvantages which limit or prevent their use. For example, lithium hexafluoroarsenate ($LiAsF_6$), because of the toxicity of arsenic derivatives and degradation products, cannot be used. Another example, lithium perchlorate ($LiClO_4$), is a highly reactive salt that can explode under abusive oxidative conditions. Lithium (trifluoromethylsulfonyl)imide (LiTFSI), on the other hand, corrodes the aluminum of the current collector. Boron-based salts have also been proposed, such as lithium tetrafluoroborate ($LiBF_4$), which has been criticized for its low conductivity and its limited solubility in carbonates, still has the advantage of being inexpensive and not very sensitive to moisture and therefore safer. Lithium (oxalato)borate (LiBOB), which has many advantages such as high electrochemical and thermal stability (293° C.), generates gas when $LiCoO_2$-based cathodes are used. In view of the chemical, electrochemical and thermal properties, as well as their moisture stability, boron-based lithium salts have been developed in recent years and more particularly borates and boroxines.

Generally, borates are prepared using an alcohol, a carboxylic acid, or a dicarboxylic acid, but also multifunctional carboxylic acid-alcohol molecules from $B(OR)_3$ or Ar—B$(OR)_2$ (*J. Power Sources*, 2014, 247, 813; *J. Phys. Chem.*, 2009, 113, 5918; *J. Electrochem. Soc.*, 1998, 145, 2813). Preparation of lithiated borates was obtained by using a nucleophile (alcohol) or a carboxylic acid in the presence of a lithium base such as LiOH, $Li_2CO_3$, or Li (*J. Electrochem. Soc.*, 1996, 143, 3572) and a boron-based compound: $B(OMe)_3$, $LiBF_4$ and $BF_3$.

The preparation of boroxines is, in turn, generally carried out by dehydration of $ArB(OH)_2$ or $ArOB(OH)_2$, to obtain respectively $(BOAr)_3$ or $B(O(OAr))_3$ (*J. Power Sources*, 2014, 247, 813; *J. Phys. Chem.*, 2009, 113, 5918; *J. Am. Chem. Soc.*, 2013, 135, 10990). For this type of reaction, the substituted boric acid ($ArB(OH)_2$ or $ArOB(OH)_2$) must be prepared beforehand, the preparation of boroxines therefore being carried out in two steps. The addition of a boroxine like trimethylboroxine (TMB) in an electrolyte composition, at a concentration of 0.5 to 1 wt % has improved the electrolyte's electrochemical properties. TMB is preferentially oxidized and forms an SEI on the cathode. It has been shown that the addition of a boroxine can improve ionic conductivities, as well as the capacity retention (*J. Electro. Soc.*, 2014, 161, 2255; *Electrochem. Comm.*, 2013, 28, 20; *Electrochemica Acta*, 2015, 173, 804).

In order to improve battery life and safety, it is crucial to improve the properties (such as thermal, electrochemical, moisture stability, etc.) of existing electrolytes, by developing new salts and/or additives for electrolyte compositions.

SUMMARY

According to a first aspect, the present application relates to compounds based on an element from the boron family. For example, the compounds are of Formula I or II, and/or their salts:

wherein:

M is an atom selected from the elements of column 13 (Group IIIA) of the periodic table of the elements, for example, a boron, aluminum, gallium, indium or thallium atom, for example a boron, aluminum, gallium or indium atom, or a boron or aluminum atom;

X is independently selected from O, S, NH, NR, or a C(O)O or $S(O)_2O$ group, wherein said group is attached to M by an oxygen atom;

R is independently selected from substituted or unsubstituted linear or branched alkyl, cycloalkyl and aryl groups, or 2 or 3 R groups combined with X radicals attached thereto form a 5 to 7 membered ring comprising M, or a bicyclic group having from 7 to 10 members comprising M, and/or at most one XR is a hydroxyl group; and A⁺ is a metallic cation or a cation of an organic base, and where the total molar ratio of A⁺ relative to the rest of the molecule is adjusted to achieve electroneutrality.

According to one embodiment, A⁺ is a metallic cation, for example, selected from cations of the elements Li, Na, K, Rb, Cs, Be, Mg, Ca, Sr, Ba, Al, Zn, Cu, Sc, Y, Fe, Co, Ni, Ti, Sn, V, Cr, or Mn. According to one embodiment, A⁺ is a cation of an alkali or alkaline earth metal (Li⁺, Na⁺, K⁺, Rb⁺, Cs⁺, Be²⁺, Mg²⁺, Ca²⁺, Sr²⁺, and Ba²⁺), for example, A⁺ is Li⁺.

According to another embodiment, A⁺ is an organic cation, for instance, selected from ammonium, alkylammonium, dialkylammonium, trialkylammonium, tetraalkylammonium, triarylammonium, tricycloalkylammonium, tetracycloalkylammonium, imidazolium, 1,3-dialkylimidazolium, 4,5-dicyanoimidazolium, N-alkylpyrrolidinium, N-alkylpiperidinium, oxoniums, trialkyloxonium, sulfoniums, trialkylsulfonium, triarylsulfonium, tricycloalkylsulfonium, phosphoniums, tetraalkylphosphonium, tetraarylphosphonium, tetracycloalkylphosphonium, trialkylphosphonium, triarylphosphonium, tricycloalkylphosphonium, trialkylselenium, tetraalkylarsonium, and other similar bases. According to another embodiment, A⁺ is an organic cation of an organic base, for instance selected from trimethylamine, triethylamine, tripropylamine, tributylamine, N-alkylpyrrolidine, N-alkylmorpholine, N-methylimidazole, 4,5-dicyanoimidazole, pyridine, picoline, lutidine, quinoline, N,N-dimethylaniline, diisopropylethylamine, quinuclidine, trimethylphosphine, and other similar organic bases.

According to an embodiment, the compound of Formula I is selected from the compounds of Formulae I(a), I(b1), I(b2) and I(c), and/or their salts:

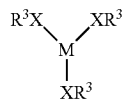

I(a)

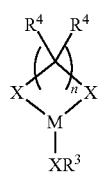

I(b1)

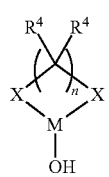

I(b2)

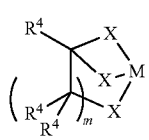

I(c)

wherein X, M, are as previously defined,
R³ is a substituted or unsubstituted group selected from linear or branched alkyls, cycloalkyls and aryls;

R⁴ is, independently in each occurrence, selected from hydrogen, halogen, and substituted or unsubstituted linear or branched alkyl, cycloalkyl and aryl groups, or R⁴ groups combined with their adjacent carbon atoms form a mono or bicyclic cycloalkyl or an aryl, and where n is different from 1 when X is O or NH in each occurrence;

n is an integer selected from 1, 2, 3 and 4; and m is an integer selected from 0, 1, and 2.

According to one embodiment, the compound of Formula II is selected from compounds of Formulae II(a), II(b1), II(b2) and II(c) and/or their salts:

II(a)

II(b1)

II(b2)

II(c)

wherein X, M, R³, R⁴, A⁺, n and m are as previously defined.

According to one embodiment, the compound is of Formula III, and/or its salts:

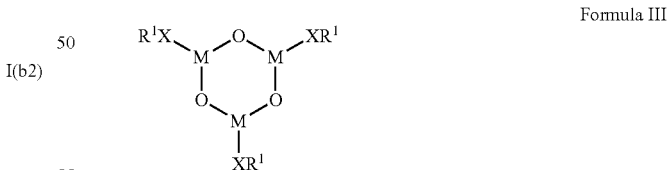

Formula III wherein M and X are as previously defined; and
R¹ is independently selected from substituted or unsubstituted linear or branched alkyl, cycloalkyl and aryl groups.

According to one of the above embodiments, at least one of the compound's X group is a C(O)O or S(O)₂O group. For example, at least one group X is a S(O)₂O group. In some embodiments, all X moieties of the compound bound to the M atom are S(O)₂O groups.

According to one of the above embodiments, the compound is as described, and M is a boron atom. According to another embodiment, M is an aluminum atom. According to a further embodiment, M is a gallium atom. According to yet another embodiment, M is an indium atom.
According to one example, the compound of Formula I as herein described, is selected from the following compounds:
Compound A1
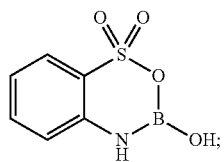
Compound A2
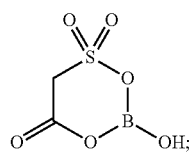
Compound A3
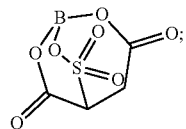
Compound A4
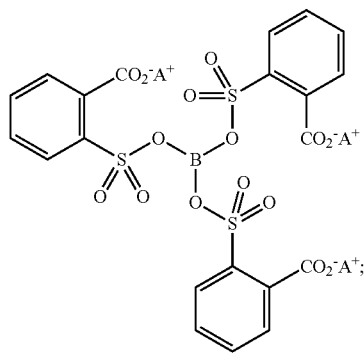
Compound A5
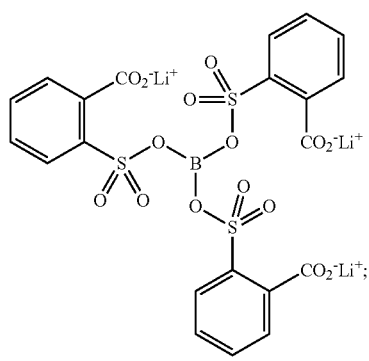
Compound A6
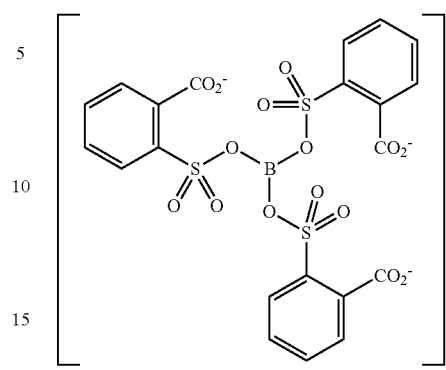
Compound A7
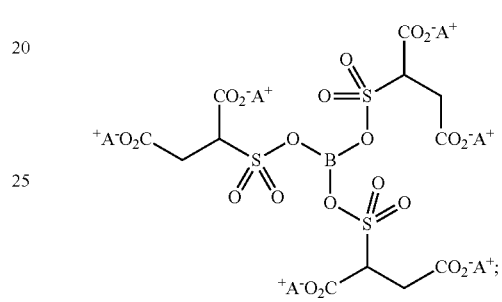
Compound A8
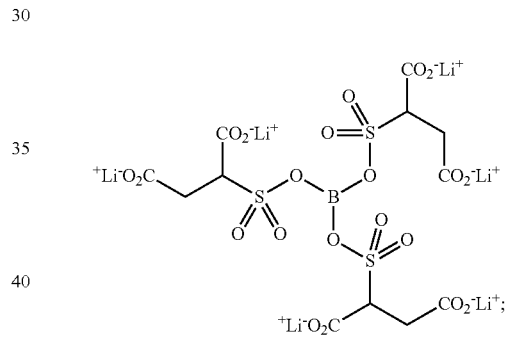
Compound A9
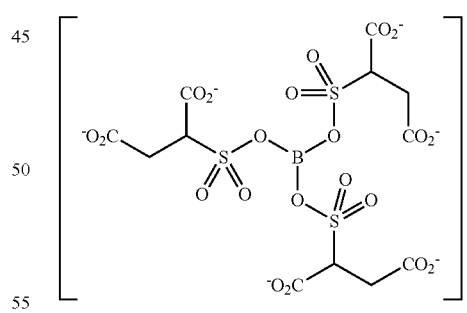
Compound A10

-continued
Compound A11
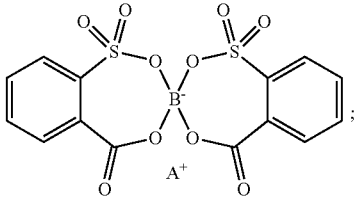
Compound A12
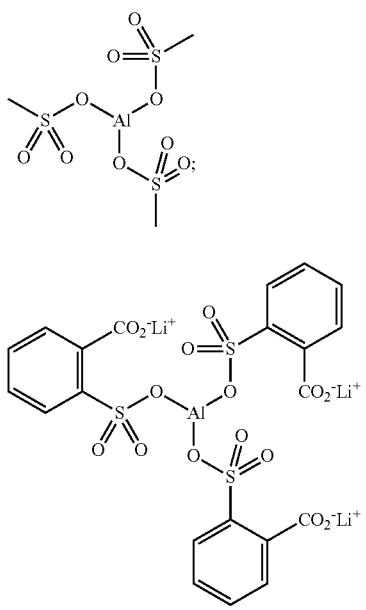
where A⁺ is as previously defined.
According to another example, the compound of Formula II as herein described, is selected from the following compounds:
Compound B1
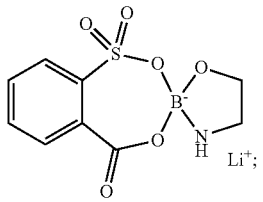
Compound B2
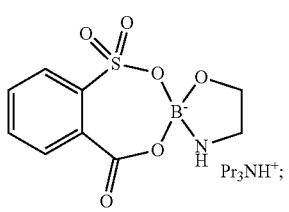
Compound B3
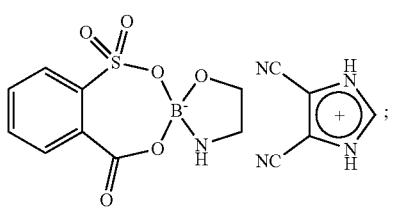
Compound B4
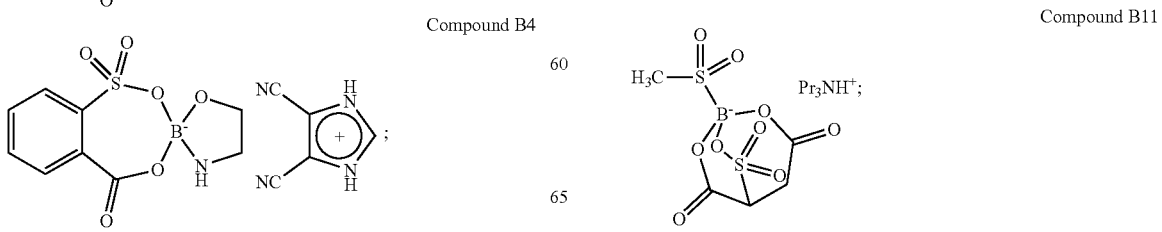
-continued
Compound B5
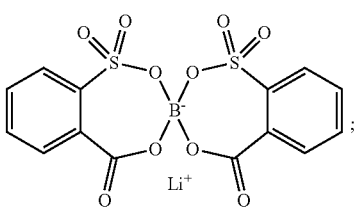
Compound B6
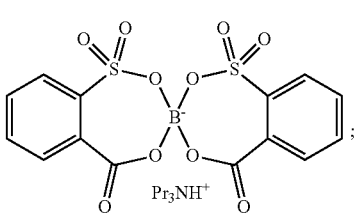
Compound B7
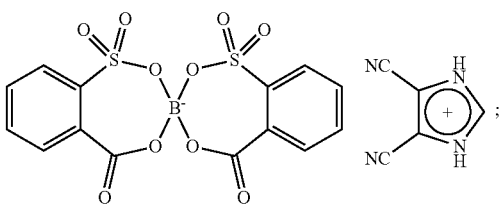
Compound B8
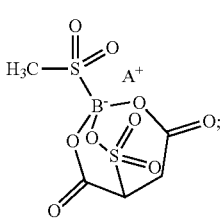
Compound B9
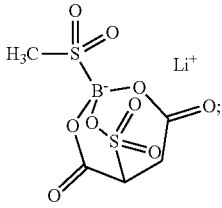
Compound B10
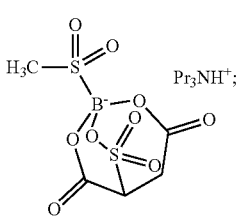
Compound B11

-continued
Compound B12
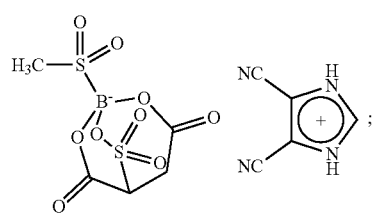
Compound B13
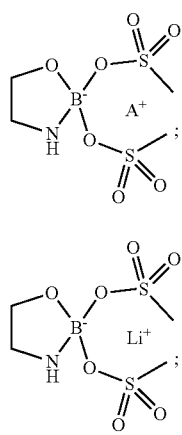
Compound B14
Compound B15
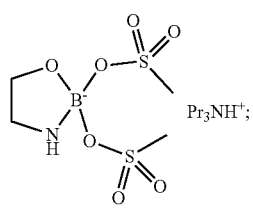
Compound B16
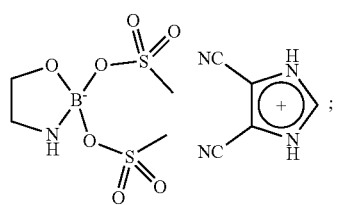
Compound B17
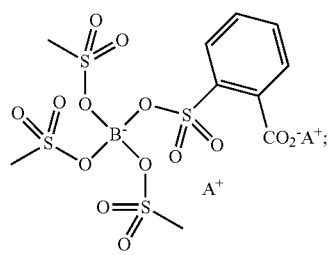
Compound B18
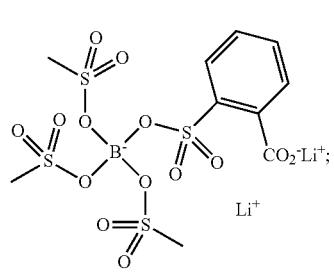
-continued
Compound B19
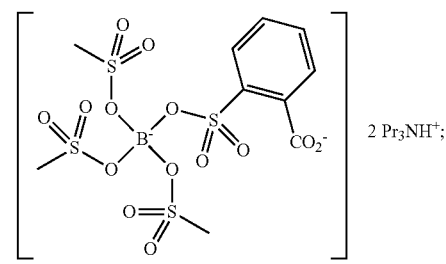
Compound B20
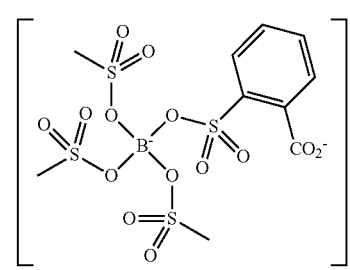
Compound B21
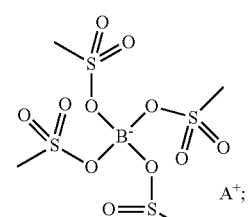
Compound B22
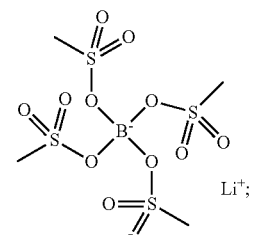
Compound B23
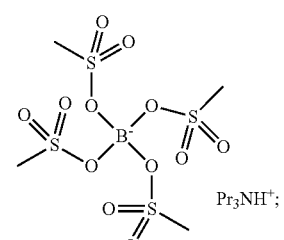
Compound B24
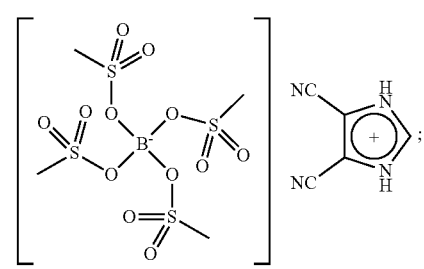

Compound B25
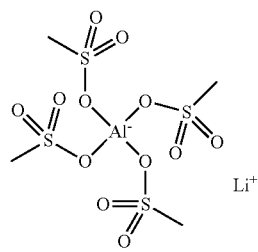
where A⁺ is as previously defined.
According to an additional example, the compound of Formula III as described herein, is selected from the following compounds:
Compound C1
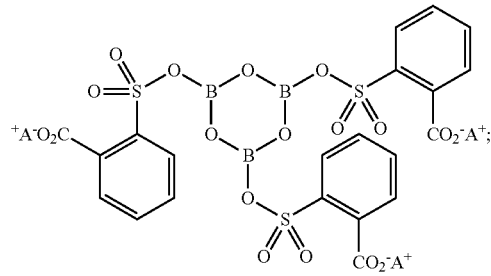
Compound C2
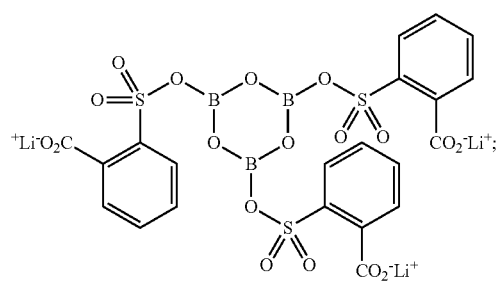
Compound C3
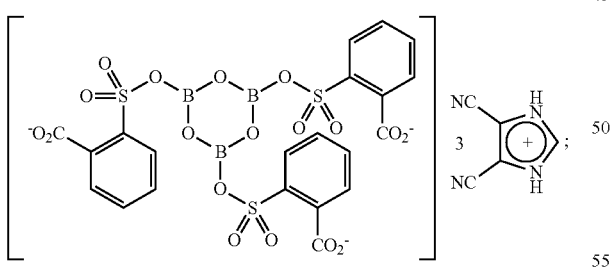
Compound C4
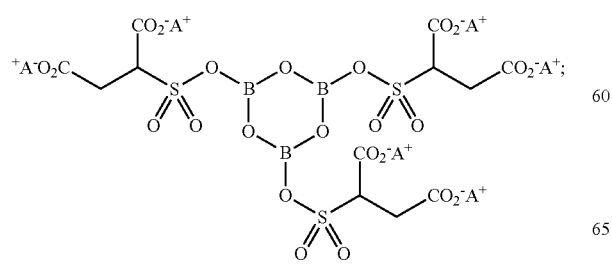
Compound C5
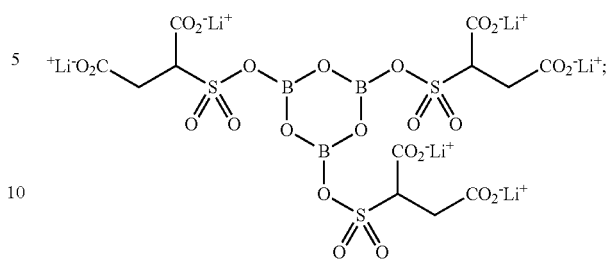
Compound C6
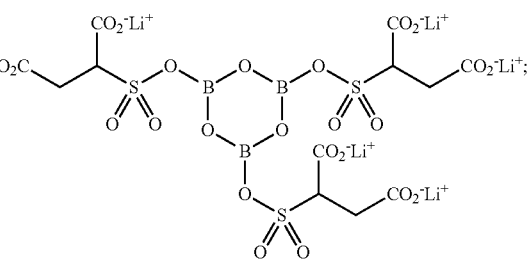
Compound C7
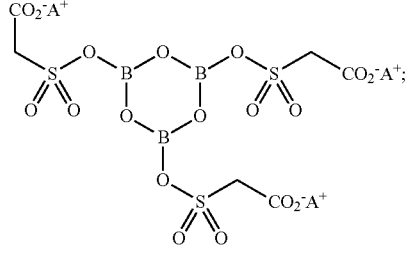
Compound C8
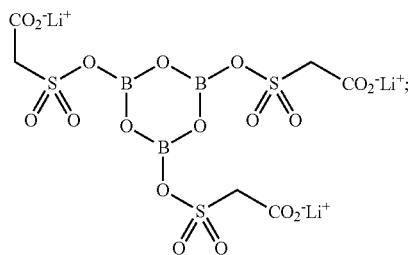
Compound C9
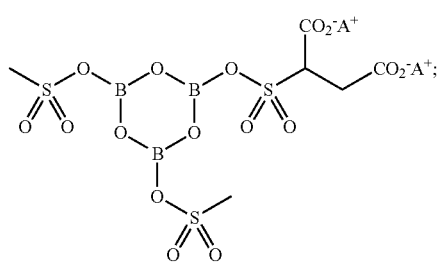
Compound C10
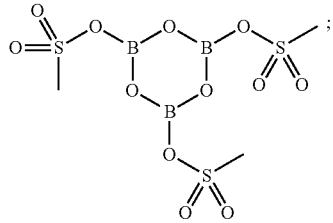

-continued

Compound C11
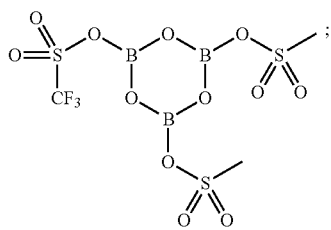

Compound C12
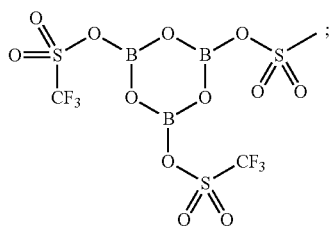

Compound C13
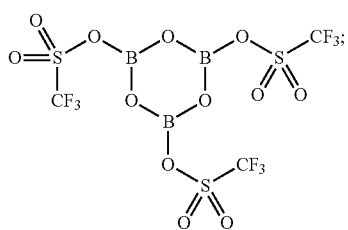

Compound C14
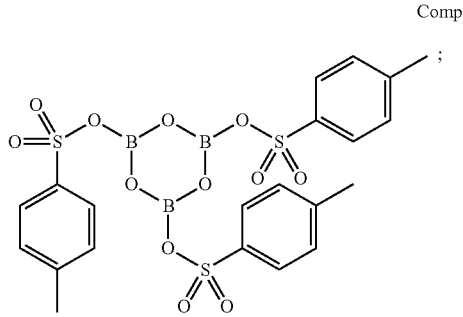

Compound C15
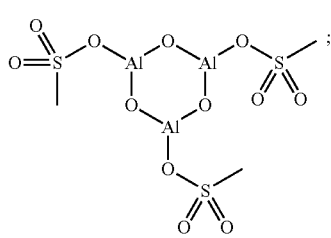

Compound C16
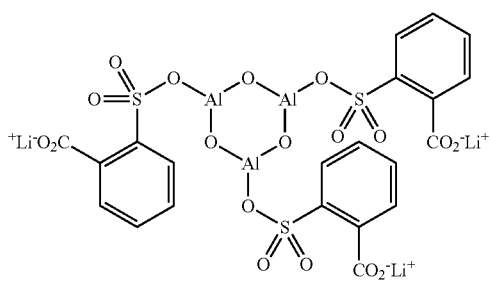

where $A^+$ is as previously defined.

According to another aspect, the present application relates to a process for preparing a compound as described herein, comprising a step of contacting a compound of Formula IV:

$$M(X')_3 \tag{IV}$$

wherein M is as previously defined and X' is selected from hydrogen, OH, halogen (e.g. F, Cl, Br), $C_1$-$C_4$alkyl, O—$C_1$-$C_4$alkyl (e.g. OMe, OEt, Oi-Pr), $C_1$-$C_4$alkylcarboxylate, sulfate, phosphate, or a salt of the compound of Formula IV, for instance, a compound of Formula (IV) or one of its salt is selected from $B(OH)_3$, $BH_3$, $NaBH_4$, $LiBH_4$, $BBr_3$, $BCl_3$, $BF_3$, $BMe_3$, $BEt_3$, $B(i-Pr)_3$, $B(OMe)_3$, $LiBF_4$, $Al(OH)_3$, $AlBr_3$, $AlCl_3$, $Al(OMe)_3$, $Al(OEt)_3$ $Al(Oi-Pr)_3$, $Al(OC(O)C_2H_5)_3$, $Al(OC(O)CH(CH_3)_2)_3$, $Al(OC(O)CH_3)_3$, $AlPO_4$, $Al_2(SO_4)_3$, $AlMe_3$, $AlEt_3$, $Al(i-Pr)_3$, $LiAlH_4$ and $LiAlCl_4$;

with at least one compound of Formula V:

$$RXH \tag{V}$$

where R and X are as previously defined and where two or three R groups may be linked to form a single compound comprising two or three XH groups.

According to one embodiment, the process comprises contacting about one equivalent of the compound of formula IV and the amount of compound of Formula V corresponding to 2, 3 or 4 molar equivalents of XH group, the presence of a base for forming a salt with XH groups neutralizing the function being excluded from the calculation. Examples of bases are described below, which may be inorganic or organic.

According to one embodiment, the compound of Formula V (RXH) is a compound selected from Formulae V(a) to V(c):

$$R^3XH \tag{V(a)}$$

(V(b))

(V(c))

wherein X, n, m, $R^3$, and $R^4$ are as previously defined.

According to one embodiment, at least one X group is a C(O)O or $S(O)_2O$ group, or at least one X group is a $S(O)_2O$ group.

According to one example, in the compound of Formula IV, M is a boron atom. According to another example, M is an aluminum atom.

In the above process and compounds, $R^3$ may be an alkyl, cycloalkyl or aryl substituted with at least one group selected from OH, $NH_2$, $N(R^2)H$, $N(R^2)_2$, $CO_2H$ and $SO_3H$, or a salt thereof when applicable, where $R^2$ is selected from optionally substituted alkyl, cycloalkyl or aryl groups. For instance, $R^3$ is an alkyl, cycloalkyl or aryl substituted with at least one group selected from $CO_2H$ and $SO_3H$ or a salt formed of a $CO_2^-$ or $SO_3^-$ anion and an $A^+$ cation, where $A^+$ is as previously defined. According to another example, $R^3$ is selected from substituted or unsubstituted alkyl and phenyl groups, for instance, methyl, trifluoromethyl, carboxyphenyl, carboxyalkyl, and dicarboxyalkyl groups.

In the above process and compounds, $R^4$ may be a hydrogen atom in each occurrence.

According to an embodiment, the compound of Formula V is a compound of Formula V(b), n is equal to 2 and $R^4$ groups combined with carbon atoms attached thereto form an aryl group.

According to another embodiment, the compound of Formula V is selected from pinacol, orthanilic acid, sulfoacetic acid, sulfobenzoic acid, ethanolamine, methanesulfonic acid, triflic acid and sulfosuccinimic acid.

According to one embodiment, the above-described process comprises:

preparing a compound of Formula I(a) comprising contacting the compound of Formula IV with about 3 molar equivalents of a compound of Formula V(a), optionally in the presence of a base; or preparing a compound of Formula I(b1) comprising contacting the compound of Formula IV with about 1 molar equivalent of a compound of Formula V(a) and about 1 molar equivalent of a compound of Formula V(b), optionally in the presence of a base; or preparing a compound of Formula I(b2) comprising contacting the compound of Formula IV with about 1 molar equivalent of a compound of Formula V(b), optionally in the presence of a base; or preparing a compound of Formula I(c) comprising contacting the compound of Formula IV with about 1 molar equivalent of a compound of Formula V(c), optionally in the presence of a base; or preparing a compound of Formula II(a) comprising contacting the compound of Formula IV with about 4 molar equivalents of a compound of Formula V(a) in the presence of a base; or preparing a compound of Formula II(b1) comprising contacting the compound of Formula IV with about 1 molar equivalent of a compound of Formula V(b) and about 2 molar equivalents of a compound of Formula V(a) in the presence of a base; or preparing a compound of Formula II(b2) comprising contacting the compound of Formula IV with about 2 molar equivalents of a compound of Formula V(b) in the presence of a base; or preparing a compound of Formula II(c) comprising contacting the compound of Formula IV with about 1 molar equivalent of a compound of Formula V(c) and about 1 molar equivalent of a compound of Formula V(a) in the presence of a base.

According to another embodiment, the present application relates to a process from preparing a compound of Formula III, comprising a step of contacting a compound of Formula IV:

$$M(X')_3 \quad (IV)$$

wherein M and X' are as previously defined;
with at least one compound of Formula VI:

$$R^1XH \quad (VI)$$

where $R^1$ and X are as defined herein.

For example, the process comprises preparing a compound of Formula III comprising contacting a compound of Formula IV with about 1 molar equivalent of a compound of Formula VI.

Preferentially, the processes as herein described comprise a step of removing water. According to one example, the process comprises a step of heating to reflux in the presence of a solvent forming an azeotrope with water. In another example, the process comprises the use of a desiccant.

In another aspect, the present application relates to the use of a compound as described herein, or a compound prepared by a process as described herein, in an electrolyte composition. The present application also relates to an electrolyte composition comprising at least one compound as described herein, or a compound prepared according to a process as described herein. According to one embodiment, the electrolyte composition further comprises a liquid solvent or a solvating polymer. For example, the electrolyte composition is a liquid electrolyte, or a gel polymer electrolyte, or a solid polymer electrolyte.

According to a last aspect, the present application relates to an electrochemical cell comprising an electrolyte composition, as described herein, between an anode and a cathode. For example, the electrochemical cell based on metal ion, such as $Li^+$, $Na^+$, $K^+$, $Rb^+$, $Cs^+$, $Be^{2+}$, $Mg^{2+}$, $Ca^{2+}$ is of the lithium or lithium-ion battery type.

DETAILED DESCRIPTION

Figure 1:
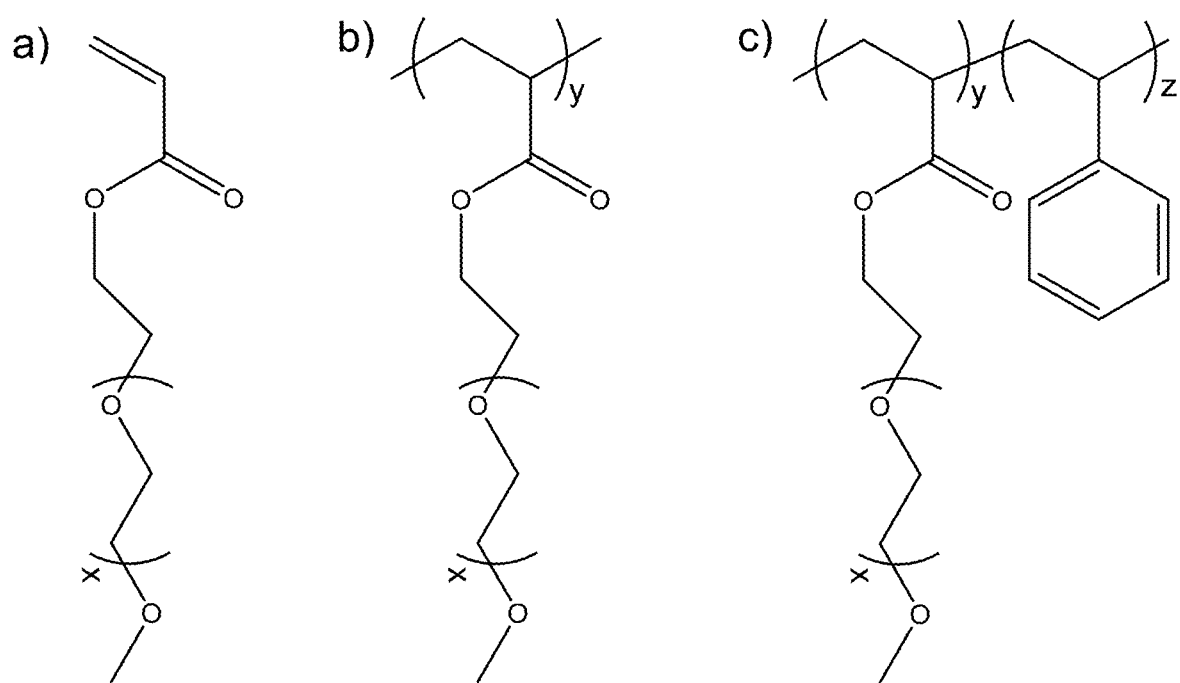
FIG. 1 illustrates the chemical structure (a) of the poly(ethylene glycol)480 (AcrPEG480, x=8, $M_n$=480 g/mol) acrylate macromonomer; (b) of a poly(poly(ethylene glycol) 480 acrylate) (PAcrPEG480); (c) of a di-block copolymer of PAcrPEG480 and polystyrene (PAcrPEG480-b-PS) used in Example 2.

All technical and scientific terms used herein have the same meaning as commonly understood by the person skilled in the art of the present technology. The meaning of some of the terms and expressions used is nevertheless provided below.

The number of carbon atoms in a hydrocarbon group may be indicated by the prefix "$C_x$-$C_y$," where x is the minimum number and y is the maximum number of carbon atoms in the group.

The chemical structures described herein are drawn according to conventional standards known in the art. Also, when an atom, such as a carbon atom, as drawn seems to have an unsatisfactory valence, then the valence is assumed to be satisfied by one or more hydrogen atoms, even if they are not necessarily explicitly drawn.

Generally, the term "substituted", whether preceded or not by the term "optionally", means that one or more hydrogen atom(s) on the designated group is replaced by a suitable substituent. The substituents or combinations of substituents contemplated in this description are those resulting in the formation of a chemically stable compound. Examples of substituents include halogen (e.g. F, Cl, Br), hydroxyl, alkoxyl, nitrile, azido, carboxylate, alkoxycarbonyl, primary, secondary or tertiary amine, amide, nitro, silane, siloxane, thiocarboxylate, alkyl, alkenyl, aryl, or cycloalkyl. When applicable, these substituents may be further substituted with one of the above groups.

The present application relates to novel compounds based on an element of the boron family, their preparation, and their use as additive and/or salt in electrochemical cells, for example, in the composition of liquid, gel or solid electrolytes. In one example, the electrochemical cells are Li-ion-type batteries or other types of ionic batteries (for example, $Na^+$, $K^+$, $Rb^+$, $Cs^+$, $Be^{2+}$, $Mg^{2+}$, $Ca^{2+}$, etc.). In general, the groups present on the boron or aluminum atom can be varied in order to modulate the electronegativity of this atom and consequently its dissociation with a metal or organic cation.

These compounds may, for example, participate in the formation of a stable passivation layer on the current collector (e.g. made of aluminum), a stable solid electrolyte interface (SEI) on the cathode or anode, and/or improve battery life at room temperature, for example, by improving capacity retention at high-temperature and/or at high-voltage.

The compounds described herein may be used as additives, as organic or metal salts (when the compounds comprise an organic or metal cation), alone or in combination with other salts, for example in a liquid solvent or a solvating polymer (gel or solid).

According to one embodiment, the present description relates to compounds of Formula I or II, or a salt thereof:

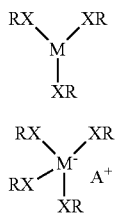

Formula I

Formula II wherein:
M is an atom selected from the elements of column 13 (Group IIIA) of the periodic table of elements, for instance, a boron, aluminum, gallium, indium or thallium atom, for example a boron, aluminum, gallium or indium atom, or a boron or aluminum atom;
X is independently selected from O, S, NH, NR, or a C(O)O or S(O)$_2$O group, wherein said group is attached to M via an oxygen atom;
R is independently selected from substituted or unsubstituted linear or branched alkyl, cycloalkyl and aryl groups, or 2 or 3 R groups combined with the X radicals attached thereto form a cycle having from 5 to 7 members comprising M, or a bicyclic group having from 7 to 10 members comprising M, and/or at most one XR is a hydroxyl group; and
$A^+$ is a metallic cation or a cation of an organic base, and where the total molar ratio of $A^+$ relative to the rest of the molecule is adjusted in order to achieve electroneutrality.

According to one embodiment, at least one X group is a C(O)O or S(O)$_2$O group, or at least one X group is a S(O)$_2$O group.

Non-limiting examples of $A^+$ as metal cation include cations of elements Li, Na, K, Rb, Cs, Be, Mg, Ca, Sr, Ba, Al, Zn, Cu, Sc, Y, Fe, Co, Ni, Ti, Sn, V, Cr, or Mn, or cations of alkali or alkaline earth metals, for example, $Li^+$, $Na^+$, $K^+$, $Rb^+$, $Cs^+$, $Be^{2+}$, $Mg^{2+}$, $Ca^{2+}$, $Sr^{2+}$, and $Ba^{2+}$, for instance, $A^+$ is $Li^+$.

Examples of $A^+$ as cation of an organic base comprise the cations ammonium, alkylammonium, dialkylammonium, trialkylammonium, tetraalkylammonium, triarylammonium, tricycloalkylammonium, tetracycloalkylammonium, imidazolium, 1,3-dialkylimidazolium, 4,5-dicyanoimidazolium, N-alkylpyrrolidinium, N-alkylpiperidinium, oxoniums, trialkyloxonium, sulfoniums, trialkylsulfonium, triarylsulfonium, tricycloalkylsulfonium, phosphoniums, tetraalkylphosphonium, tetraarylphosphonium, tetracycloalkylphosphonium, trialkylphosphonium, triarylphosphonium, tricycloalkylphosphonium, trialkylselenium, tetraalkylarsonium, and other similar bases. For example, $A^+$ may be the cation of an organic base selected from trimethylamine, triethylamine, tripropylamine, tributylamine, N-alkylpyrrolidine, N-alkylmorpholine, N-methylimidazole, 4,5-dicyanoimidazole, pyridine, picoline, lutidine, quinoline, N,N-dimethylaniline, diisopropylethylamine, quinuclidine, trimethylphosphine, and of other similar organic bases.

For example, the compounds are of Formulae I(a), I(b1), I(b2) and I(c), or one of Compounds A1 to A12, and/or their salts. According to another example, the compounds are of Formulae II(a), II(b1), II(b2) and II(c), or one of Compounds B1 to B25, and/or their salts.

According to another embodiment, the present description relates to compounds of Formula III, or one of its salts:

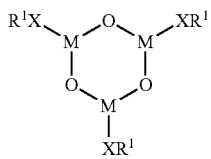

Formula III wherein M and X are as previously defined; and
$R^1$ is independently selected from substituted or unsubstituted, linear or branched alkyl, cycloalkyl and aryl groups.

According to an embodiment, at least one X group is a C(O)O or S(O)$_2$O group, or at least one X group is a S(O)$_2$O group.

According to one embodiment, in the compounds of Formulae I, II or III, groups R or $R^1$ are independently alkyl, cycloalkyl or aryl groups substituted with at least one group selected from OH, $NH_2$, $N(R^2)H$, $N(R^2)_2$, C(O)OH and $SO_3H$, or a salt thereof when applicable, for example, a salt of a $C(O)O^-$ and $SO_3^-$ ion and an $A^+$ cation, where $A^+$ is as defined above and $R^2$ is selected from optionally substituted alkyl, cycloalkyl or aryl groups.

For example, the compounds correspond to one of Compounds C1 to C16, and/or their salts.

General Process

The preparation of the above compounds is done in a similar manner, the final product being largely determined by the number of equivalents of each reagent and the conditions used. Boron and aluminum (or other atoms in column 13), being very good electrophiles, for example when trisubstituted, can react with nucleophiles (including carboxylic and sulfonic acids). For example, an electrophilic boron or aluminum derivative such as boric acid or aluminum hydroxide or a halogenated or alkoxylated equivalent is contacted with a compound comprising one or more nucleophilic groups(s), for example a hydroxyl, a thiol, an amine, a sulfonic acid, and/or a carboxylic acid. Preferably, the nucleophilic compound comprises at least one sulfonic acid or carboxylic acid group, or at least one sulfonic acid group.

Generally, during the preparation of the compounds of Formulae I and II (and their subgroups as defined below) or of Formula III, the reaction between the electrophilic boron or aluminum derivative and the nucleophilic compound is performed in the presence of a solvent, usually a non-reactive organic solvent or, exceptionally, an aqueous solvent. Non-limiting examples of organic solvents include aliphatic or cyclic ethers (such as diethyl ether, methyl t-butyl ether (MTBE), tetrahydrofuran (THF), dioxane, diglyme, etc.), halogenated solvents (such as dichloromethane (DCM or $CH_2Cl_2$), dichloroethane (DCE), etc.), and aromatic solvents (such as toluene, benzene, etc.), or combinations thereof. According to one example, the solvent is THF, $CH_2Cl_2$ or a mixture thereof. According to another example, the solvent is toluene.

The presence of a base may be required in the medium to neutralize an acidic function, for example, a substituent on a R group, or to neutralize the $M^-$ element when tetrasubstituted. For example, when $A^+$ is a metal cation, the base may be selected from lithium or sodium bases, for example, selected from lithium hydroxide, sodium hydroxide, lithium methoxide, sodium methoxide, lithium ethoxide, sodium ethoxide, lithium isopropoxide, sodium isopropoxide, lithium tert-butoxide, sodium tert-butoxide, lithium hydride, sodium hydride, n-butyllithium, n-butylsodium, s-butyllithium, lithium diisopropylamide, tert-butyllithium, methyllithium, phenyllithium, phenylsodium, benzyllithium, benzylsodium, lithium dimsylate, sodium dimsylate, lithium carbonate, sodium carbonate, lithium acetate, and sodium acetate. Similarly, when $A^+$ is a cation of an organic base, the base is selected from the organic bases described herein with reference to the definition of $A^+$.

In one embodiment, the method may include removing water during the reaction, for example, by addition of a desiccant, such as anhydrous magnesium sulfate or molecular sieve, or by the use of a Dean-Stark type apparatus and refluxing in an immiscible solvent forming an azeotrope with water (e.g. toluene). This makes it possible to remove traces of water present or generated in the reaction medium.

The reaction medium may be maintained at room temperature or may be heated to accelerate the reaction or to remove water (Dean-Stark, see above). The temperature may be within the range from about −78° C. to the reflux temperature of the solvent or solvent mixture used. The duration of the reaction varies, for example, depending on the involved starting materials reactivity and on the temperature used. The duration may also depend on the number of equivalents used and the respective reactivity of the alcohol/amine/acid functions present on the nucleophilic compound introduced into the reaction medium. The sulfonic acid group is generally the most reactive and will react more quickly. The medium is preferably kept under inert atmosphere (under nitrogen or argon atmosphere, for instance).

Formula I Process

According to one aspect, a process for preparing a compound of Formula I as defined above is contemplated, the process comprising a step of contacting a compound of Formula IV:

$$M(X')_3 \qquad (IV)$$

wherein M is as previously defined and X' is selected from hydrogen, OH, halogen (e.g. F, Cl, Br), $C_1$-$C_4$alkyl, O—$C_1$-$C_4$alkyl (for example, OMe, OEt, Oi-Pr), $C_1$-$C_4$alkylcarboxylate, sulfate, phosphate, or a salt of the compound of Formula IV (for example, a compound of Formula (IV) or on of its salts;

with at least one compound of Formula V:

$$RXH \qquad (V)$$

where R and X are as previously defined and where two or three R groups may be linked to form a single compound comprising two or three XH groups. The process comprises contacting about one equivalent of the compound of formula IV and of an amount of the compound of Formula V corresponding to 2 or 3 molar equivalents of XH group. Noting that the presence of a base used to form a salt with XH groups neutralizes the function which is then not considered in the calculation.

In the present process and those described in the present application, when the compound of formula V comprises several XH (nucleophile) functions including a sulfonate group, then the sulfonate group generally reacts more rapidly than other nucleophilic groups, such as hydroxyl, amine, or carboxylate groups.

Examples of compounds of Formula IV, or of one of its salts, comprise, $B(OH)_3$, $BH_3$, $NaBH_4$, $LiBH_4$, $BBr_3$, $BCl_3$, $BF_3$, $BMe_3$, $BEt_3$, $B(i-Pr)_3$, $B(OMe)_3$, $LiBF_4$, $Al(OH)_3$, $AlBr_3$, $AlCl_3$, $Al(OMe)_3$, $Al(OEt)_3$ $Al(Oi-Pr)_3$, $Al(OC(O)C_2H_5)_3$, $Al(OC(O)CH(CH_3)_2)_3$, $Al(OC(O)CH_3)_3$, $AlPO_4$, $Al_2(SO_4)_3$, $AlMe_3$, $AlEt_3$, $Al(i-Pr)_3$, $LiAlH_4$ and $LiAlCl_4$.

According to one embodiment, the compound of Formula V (RXH) is a compound selected from Formulae V(a) to V(c):

$$R^3XH \qquad V(a)$$

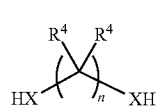

V(b)

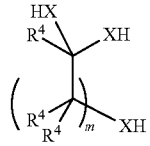

V(c)

wherein,

X is as previously defined;

n is an integer selected from 1, 2, 3 and 4;

m is an integer selected from 0, 1, and 2;

$R^3$ is a substituted or unsubstituted group selected from linear or branched alkyls, cycloalkyls and aryls; and $R^4$ is, independently in each occurrence, selected from hydrogen, halogen, and substituted or unsubstituted, linear or branched alkyl, cycloalkyl and aryl groups, or $R^4$ groups combined with carbon atoms attached thereto form a mono or bicyclic cycloalkyl group or an aryl, and where n is different from 1 when X is O or NH in each occurrence.

According to one embodiment, at least one X group is a C(O)O or S(O)$_2$O group, or at least one X group is a S(O)$_2$O group.

According to one embodiment, $R^3$ is an alkyl, cycloalkyl or aryl substituted with at least one group selected from SH, OH, NH$_2$, N($R^2$)H, N($R^2$)$_2$, CO$_2$H and SO$_3$H, or a salt thereof when applicable, for example, a salt formed of a CO$_2^-$ or SO$_3^-$ anion and an $A^+$ cation, where $A^+$ and $R^2$ are as previously defined.

According to another embodiment, $R^3$ is selected from substituted or unsubstituted alkyl and phenyl groups, for example, methyl, trifluoromethyl, carboxyphenyl, carboxyalkyl, and dicarboxyalkyl groups.

According to another example, $R^4$ is a hydrogen atom in each occurrence. In another example, in formula V(b), n is 2 and the $R^4$ groups combined with the carbon atoms attached thereto form an aryl group.

According to an embodiment of the present process, the compounds V(a) to V(c) are selected from pinacol, orthanilic acid, sulfoacetic acid, sulfobenzoic acid, ethanolamine, methanesulfonic acid, triflic acid, and sulfosuccinimic acid.

According to an embodiment, the process comprises the preparation of a compound of Formula I selected Formulae I(a), I(b1), I(b2) and I(c):

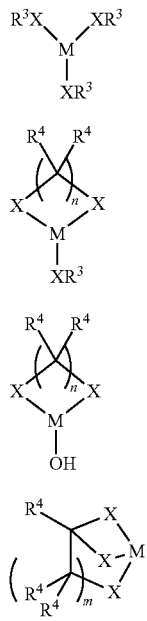

wherein X, M, $R^3$, $R^4$, n and m are a previously defined. In Formula I(a), $XR^3$ is the same or different in each occurrence.

According to one embodiment, at least one X group is a C(O)O or S(O)$_2$O group, or at least one X group is a S(O)$_2$O group.

For example, the preparation of a compound of Formula I(a) comprises contacting a compound of Formula IV with about three equivalents of at least one compound of Formula V(a). According to another example, the preparation of a compound of Formula I(a), wherein the $R^3$ group comprises a C(O)OH or SO$_2$OH group, may comprise contacting a compound of Formula IV with about three equivalents of a compound of Formula V(a) (i.e. 6 molar equivalents of anionic group) and of three molar equivalents of counterions in the form of a base (e.g. 1.5 equivalents of Li$_2$CO$_3$).

Similarly, the compound of Formula I(b2) is prepared by contacting a compound of Formula IV with about one equivalent of a compound of Formula V(b). The preparation of a compound of Formula I(b1) comprises, in addition to contacting a compound of Formula IV with about one equivalent of a compound of Formula V(b), further comprises contacting with an equivalent of a compound of Formula V(a).

In a similar manner, the compound of Formula I(c) is prepared by contacting a compound of Formula IV with about one equivalent of a compound of Formula V(c).

According to one embodiment, the compound of Formula I is selected from the following compounds:

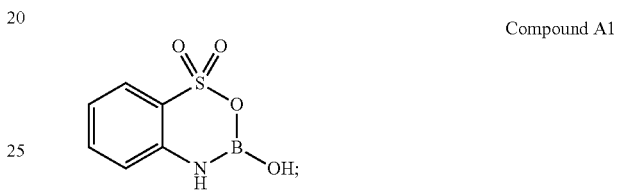

Compound A1

Compound A2

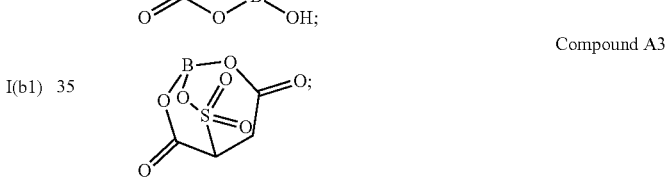

Compound A3

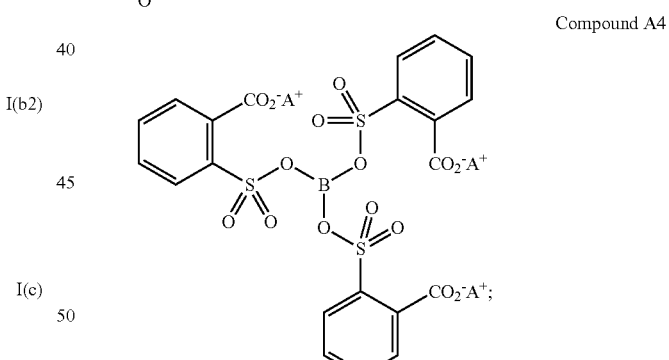

Compound A4

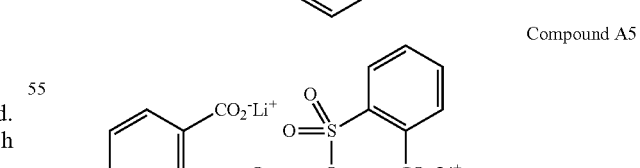

Compound A5

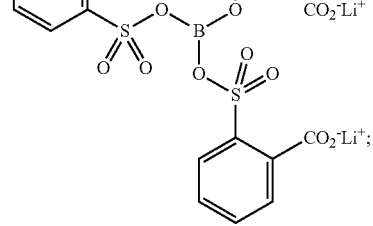

Compound A6

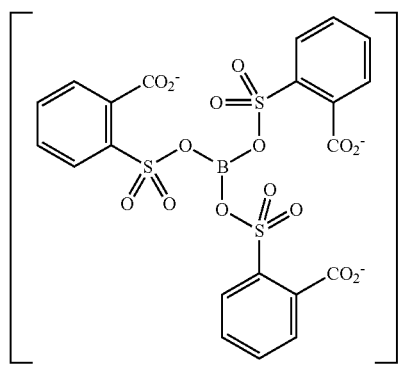

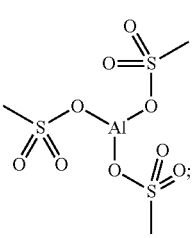

Compound A7

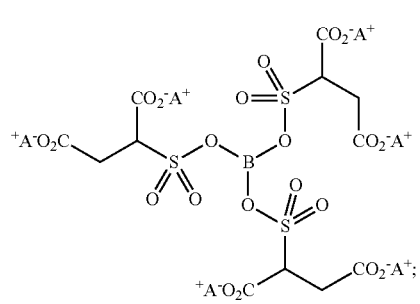

Compound A8

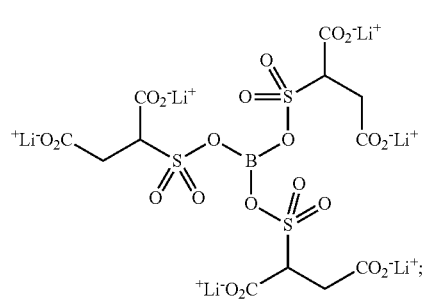

Compound A9

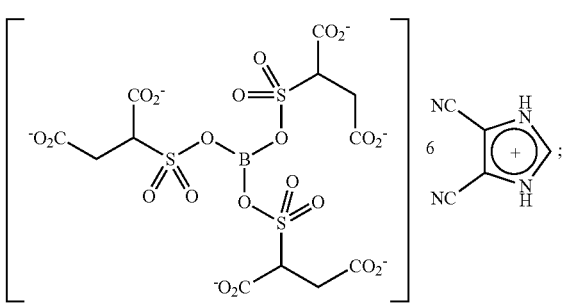

Compound A10

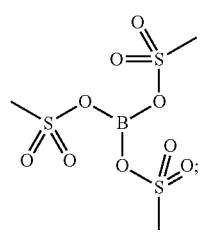

Compound A11

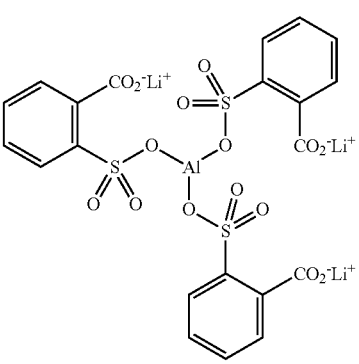

Compound A12

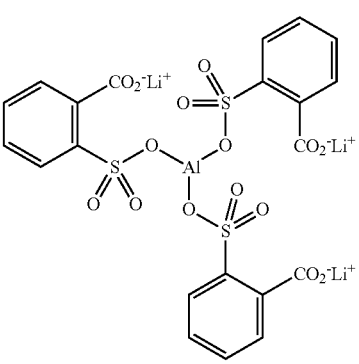

where $A^+$ is as previously defined.

Formula II Process

According to another aspect, the present description relates to a process for preparing a compound of Formula II as defined above, comprising a step of contacting, in the presence of a base, a compound of Formula IV:

$$M(X')_3 \qquad (IV)$$

wherein M and X' are as previously defined;
with at least one compound of Formula V:

$$RXH \qquad (V)$$

where R and X are as previously defined and where two or three R groups may be linked to form a single compound comprising two or three XH groups. The process comprises contacting about one equivalent of the compound of formula IV, an amount of a compound of Formula V corresponding to at least 4 molar equivalents of XH groups, and of a base comprising at least one molar equivalent of the $A^+$ cation.

According to one embodiment, the compound of Formula V (RXH) is a compound selected from Formulae V(a) to V(c) as defined above.

According to one embodiment, the process comprises the preparation of a compound of Formula II selected from Formulae II(a), II(b1), II(b2) and II(c):

II(a)

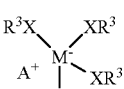

II(b1)

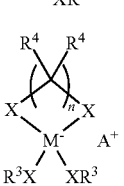

-continued

II(b2)

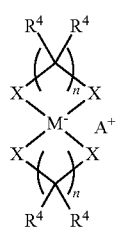

II(c)

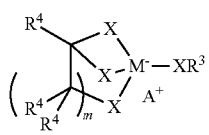

wherein X, M, $R^3$, $R^4$, n and m are as previously defined.

According to one embodiment, at least one X group is a C(O)O or $S(O)_2O$ group, or at least one X group is a $S(O)_2O$ group.

For example, the preparation of a compound of Formula II(a) comprises contacting a compound of Formula IV with four equivalents of a compound of Formula V(a) in the presence of one equivalent of $A^+$ cation in the form of a base. According to another example, the preparation of a compound of Formula II(a), wherein the $R^3$ group comprises a $CO_2H$ or $SO_3H$ group, may comprise contacting a compound of Formula IV with about four equivalents of at least one compound of Formula V(a) (i.e. 8 molar equivalents of anionic groups) and of four additional molar equivalents of cations in the form of a base (e.g. 2 equivalents of $Li_2CO_3$ for 4 of $Li^+$). Similarly, if one of the $R^3$ groups of the Formula II(a) comprises more than one $CO_2H$ or $SO_3H$ group, the preparation comprises the addition of a corresponding number of equivalents of cations in base form.

Similarly, the compound of Formula II(b2) is prepared by contacting a compound of Formula IV with about two equivalents of a compound of Formula V(b) in the presence of one equivalent of $A^+$ cation in base form. The preparation of a compound of Formula II(b1) comprises, in addition to contacting a compound of Formula IV with about one equivalent of a compound of Formula V(b), further contacting with two equivalents of a compound of Formula V(a) in the presence of one equivalent of $A^+$ cation in base form.

In a similar manner, the compound of Formula II(c) is prepared by contacting a compound of Formula IV with about one equivalent of a compound of Formula V(c) and of one equivalent of a compound of formula V(a) in the presence of one equivalent of $A^+$ cation in base form.

According to one embodiment, compounds V(a) to V(c) are selected from pinacol, orthanilic acid, sulfoacetic acid, sulfobenzoic acid, ethanolamine, methanesulfonic acid, triflic acid and sulfosuccinimic acid.

According to one embodiment, the compound of Formula II is selected from the following compounds:

Compound B1

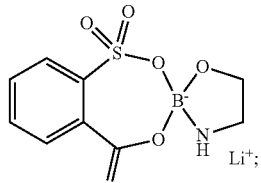

Compound B2

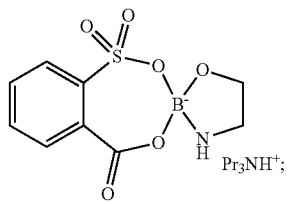

Compound B3

Compound B4

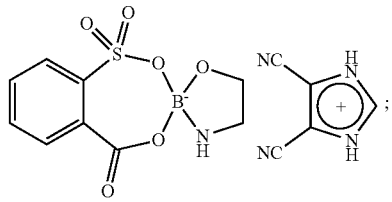

Compound B5

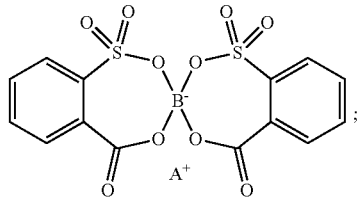

Compound B6

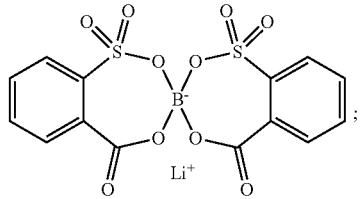

Compound B7

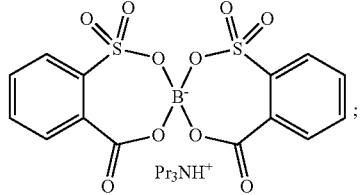

Compound B8

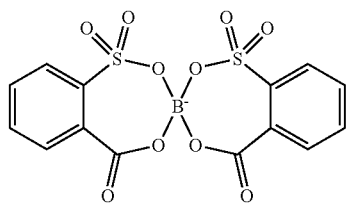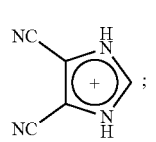

Compound B9
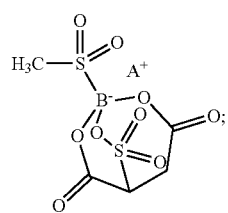
Compound B10
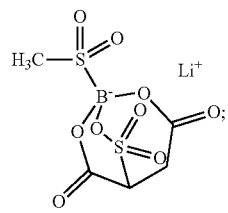
Compound B11
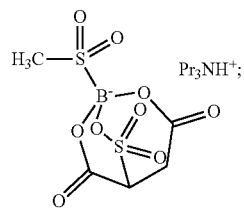
Compound B12
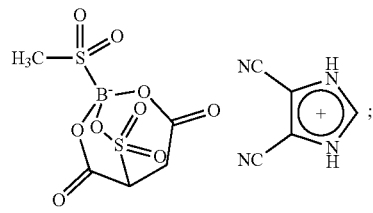
Compound B13
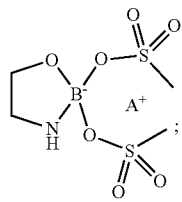
Compound B14
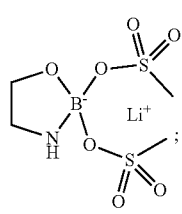
Compound B15
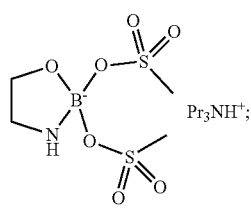
Compound B16
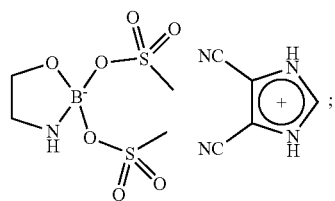
Compound B17
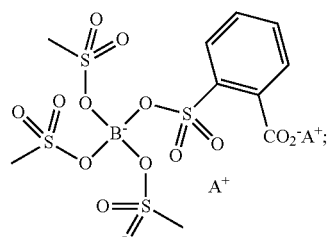
Compound B18
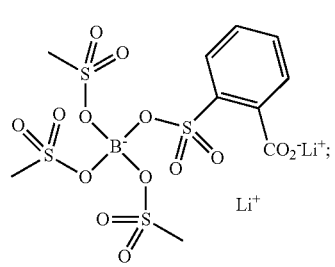
Compound B19
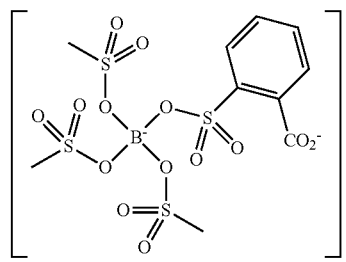
Compound B20
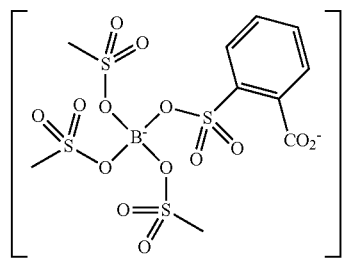
Compound B21
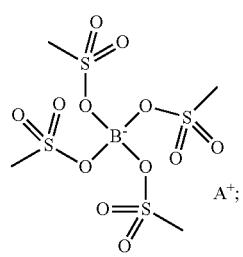

Compound B22

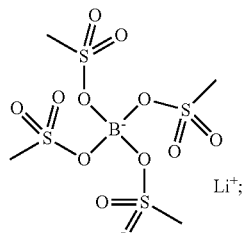

Compound B23

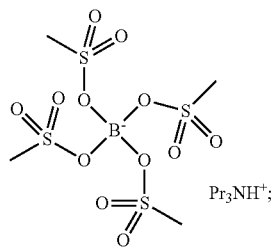

Compound B24

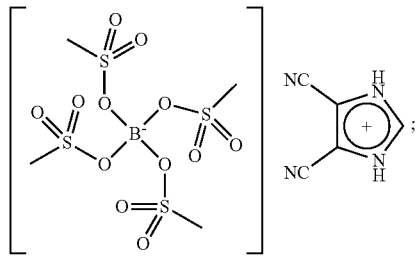

Compound B25

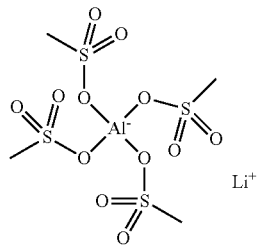

where $A^+$ is as previously defined.

Formula III Process

According to another aspect, the present description relates to a process for preparing a compound of Formula III as defined above, comprising a step of contacting a compound of Formula IV:

$$M(X')_3 \qquad (IV)$$

wherein M and X' are as previously defined;
with at least one compound of Formula VI:

$$R^1XH \qquad (VI)$$

where $R^1$ and X are as previously defined.

According to one embodiment, at least one X group is a C(O)O or S(O)$_2$O group, or at least one X group is a S(O)$_2$O group.

The process comprises contacting about one equivalent of the compound of Formula IV and of an amount of the compound of Formula VI corresponding to at least 1 molar equivalent (i.e. the $R^1$X:M ratio is about 1). The process includes a step of heating and/or removing water. For example, the process comprises heating the compounds in a solvent forming an azeotrope with water (e.g., toluene), the heating being carried out at reflux and with a Dean-Stark-type apparatus.

For preparing the compounds of Formula III, with or without a counter-ion, the various reagents are brought into contact in the presence of a solvent. Preferably the solvent is toluene.

According to one embodiment, the reaction medium is first stirred at room temperature then heated to reflux and the reaction is carried out in a Dean-Stark-type assembly to remove the water from the medium. The reaction time depends mainly on the respective reactivity of the starting materials introduced into the medium and on the reaction temperature. The reaction time may be of about 1 hour to about 10 hours in total, for example, the refluxing step may last between 2 hours and 8 hours.

In one example, the preparation of a compound of Formula III comprises contacting a compound of Formula IV with an equivalent of a compound of Formula VI. In another example, the preparation of a compound of Formula III, in which the $R^1$ group comprises one or more additional CO$_2$H or SO$_3$H group(s) (in addition to the XH group), may comprise contacting a compound of Formula IV with about 1 equivalent of at least one compound of Formula VI and with one molar equivalent of $A^+$ cation in base form (e.g. 2 moles of Li$^+$ per Li$_2$CO$_3$ molecule) per molar equivalent of CO$_2$H or SO$_3$H group present.

According to an embodiment, the compound of Formula III is selected from the following compounds:

Compound C1

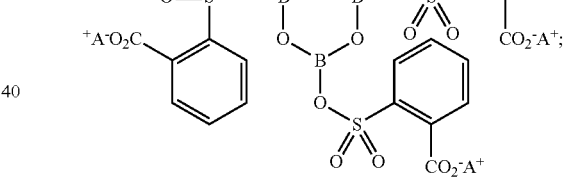

Compound C2

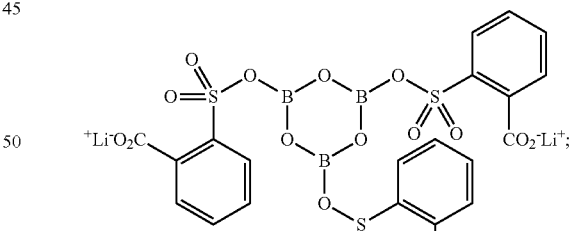

Compound C3

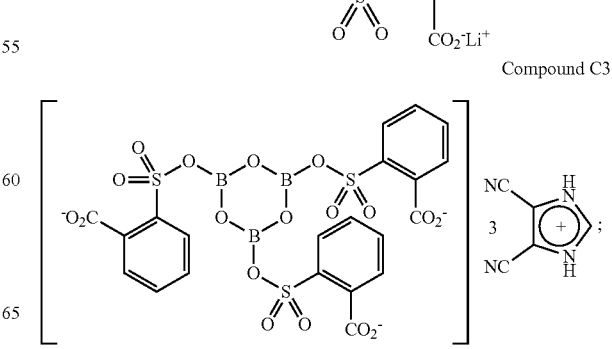

Compound C4
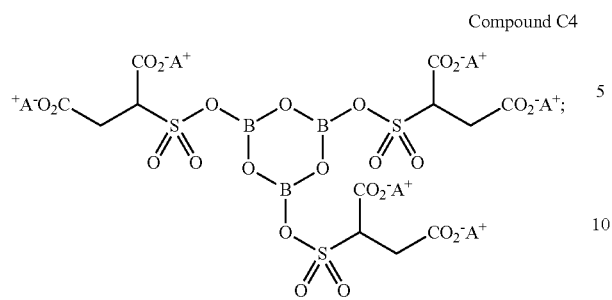
Compound C5
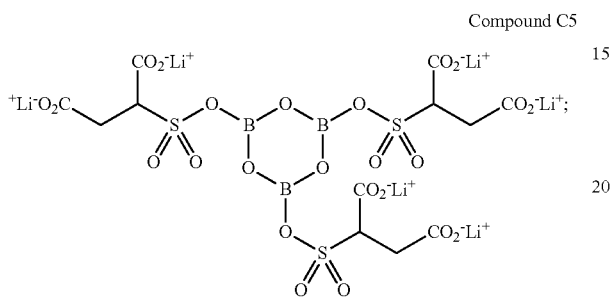
Compound C6
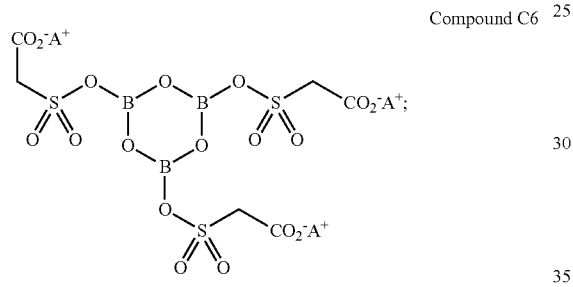
Compound C7
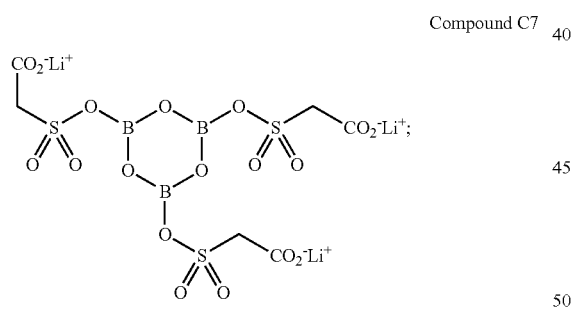
Compound C8
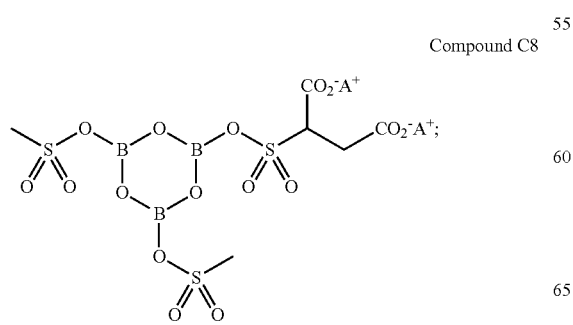
Compound C9
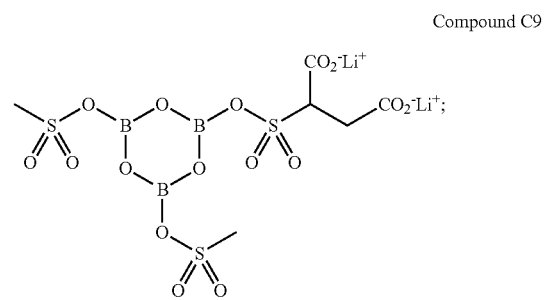
Compound C10
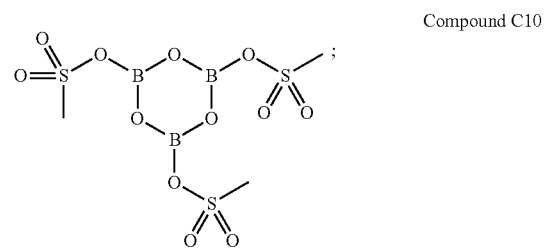
Compound C11
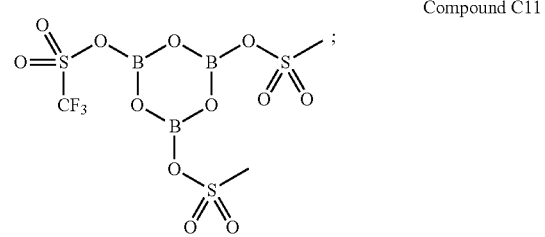
Compound C12
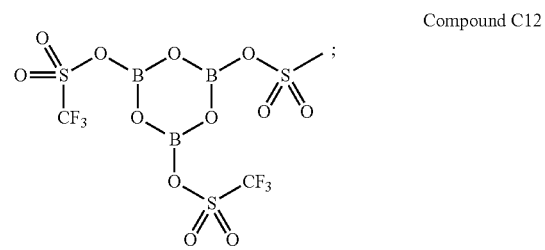
Compound C13
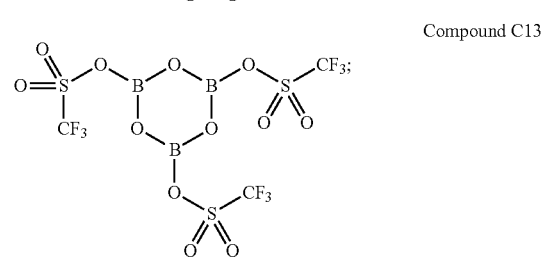
Compound C14
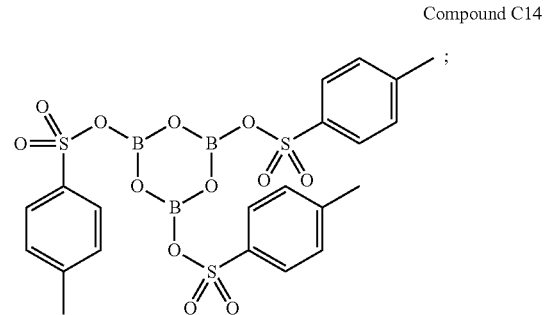

-continued

Compound C15

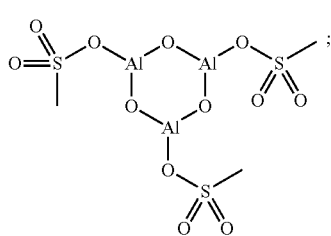

Compound C16

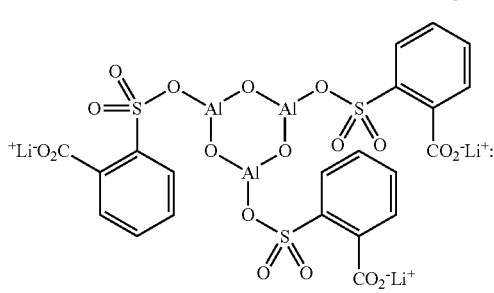

where A⁺ is as previously defined.

Use

According to another aspect, the present application also contemplates the use of the described compounds, as additives or salts in liquid, gel, or solid electrolyte compositions. When the prepared compounds comprise ionic groups in the form of metal or organic salts, these may serve as salts or additives in the electrolytes thus allowing the transport of ions from the cathode to the anode (and vice versa). For example, the compounds formed may be added in lithium-ion batteries to improve the thermal resistance, high voltage resistance, corrosion resistance of aluminum (common current collector for cathodes), thereby improving the battery life. They may also improve the performance of batteries at high charge or discharge rates (power).

The synthesized compounds have applications as additives but also as metal salts when these compounds contain a metal cation. These structures involve sulfonic acid functions and contain metal cations, the presence of which is advantageous in electrolyte compositions.

Use of the compounds of Formulae I, II or III as an electrolyte additive allows to improve the battery life. For example, addition of an additive also allows to increase the electrochemical stability up to 5 V vs. Li⁺/Li. The compounds of Formulae I, II or III comprising one or more metal cation(s) prepared by the present method may be used alone as a metal salt or mixed with one or more metal salts (dissolved in a liquid solvent or a polymer solvent), to combine the beneficial properties of each.

The compounds of Formula III can be used as additives in electrolyte compositions, but also as metal salts if these compounds contain a metal cation.

Some compounds described in the present application, for example, compounds in the form of salts comprising an organic cation, may be used as ionic liquids, alone or combined with other salts.

EXAMPLES

The following examples are for illustrative purposes and should not be construed as further limiting the scope of the invention as described in the present application.

Example 1

Compounds Synthesis 1.1 Compound A

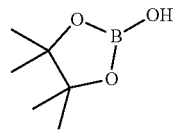

In a 100 mL round bottom flask, are introduced 1 molar equivalent (hereinbelow eq.) of pinacol (80.87 mmol), 1 eq. of boric acid (80.87 mmol) and 2 spatula tips of MgSO₄ under nitrogen. THF (50 mL) is then added, and the medium allowed to stir at room temperature (20° C.) for 2 h 30. The mixture is filtered to remove MgSO₄ and the solvent is evaporated. The obtained white powder is dried at the pump overnight. The yield of Compound A obtained is 96% (11.17 g).

$^1$H NMR (400 MHz, CDCl₃) δ ppm 1.21 (s, 12 H), 5.40-5.66 (m, 1 H); $^{11}$B NMR (128 MHz, CDCl₃) δ ppm 22.4; $^{13}$C NMR (101 MHz, CDCl₃) δ ppm 24.5, 83.2.

1.2 Compound A1

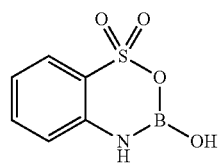 [SMILES: O=S1(=O)OB(O)Nc2ccccc21]

In a 100 mL two-neck round bottom flask are introduced 1 eq. of orthanilic acid (3.29 mmol) and then 10 mL of water are added under nitrogen. The mixture is heated at about 50° C. for 15 minutes to allow the dissolution of orthanilic acid. In parallel, a boric acid aqueous solution (1 eq., 3.29 mmol) is prepared in 10 mL of water. The solution is then slowly introduced (dropwise) via seringe into the two-neck round bottom flask. The solution is then maintained at room temperature (20° C.) for 66 hours. The obtained yield is 100% (0.655 g).

$^1$H NMR (400 MHz, D₂O) δ ppm 7.32-7.37 (m, 1 H). 7.38-7.46 (m, 1 H), 7.52-7.59 (m, 1 H), 7.83 (m, 1 H); $^{11}$B NMR (128 MHz, D₂O) δ ppm 19.40.

1.3 Compound A2

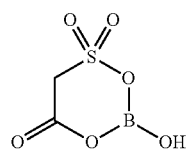

In a 100 mL round bottom flask, are introduced 1 eq. of sulfoacetic acid (1.53 mmol) and then 20 mL of distilled THF, and MgSO₄. After 5 minutes, 1 eq. of boric acid (1.53 mmol) is introduced into the flask. The mixture is maintained during 18 h at room temperature (20° C.), under nitrogen. The medium is then filtered, and the solvent is evaporated, while always remaining under nitrogen atmosphere. After drying at the pump overnight, a white solid is obtained with a yield of 85% (0.215 g).

$^1$H NMR (400 MHz, THF-d8) δ ppm 3.89 (s, 2 H); $^{11}$B NMR (128 MHz, THF-d8) δ ppm 20.25; $^{13}$C NMR (101 MHz, THF-d8) δ ppm 55.6, 165.3.

1.4 Compound A3

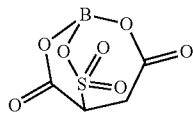

In a 100 mL round bottom flask, are introduced 1 eq. of sulfosuccinimic acid (2.68 mmol), 20 mL of THF and 2 spatula tips of MgSO$_4$. After 20 min, 1 eq. boric acid (2.68 mmol) is added. The reaction is maintained at room temperature (20° C.) overnight (18 h). The medium is then filtered to eliminate MgSO$_4$ and the solvent is evaporated. A brown oil is obtained with a yield of 91% (0.50 g).

$^1$H NMR (400 MHz, DMSO-d6) δ ppm 2.75-2.89 (m, 1 H), 2.92-3.04 (m, 1 H), 4.01-4.12 (m, 1 H); $^{11}$B NMR (128 MHz, DMSO-d6) δ ppm 20.07; $^{13}$C NMR (101 MHz, DMSO-d6) δ ppm 32.4, 62.0, 170.9.

1.5 Compound A5

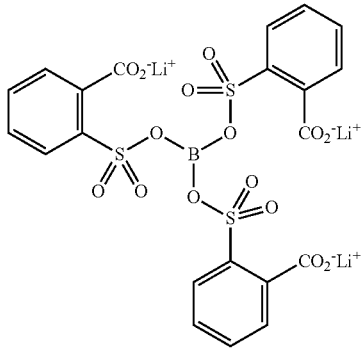

Boric acid (1 eq., 3.30 mmol) and THF (15 mL) are introduced in a 100 mL round bottom flask to obtain a partial solubilization of the boric acid. Sulfobenzoic acid (3 eq., 9.89 mmol) is then added to the medium and a homogeneous solution is obtained after 20 minutes. Subsequently, 1.5 eq. of Li$_2$CO$_3$ (4.95 mmol) are added and the medium is stirred for 30 min until solubilization. The medium is then kept for 4 hours at room temperature (20° C.), resulting in a homogeneous solution. The solvent is then evaporated and a white powder ("cloudy" type) is obtained with a yield of 98% (2.05 g).

$^1$H NMR (400 MHz, DMSO) δ ppm 7.26-7.34 (m, 6 H), 7.59-7.67 (m, 3 H), 7.85-7.91 (m, 3 H); $^{13}$C NMR (101 MHz, CDCl$_3$) δ ppm 131.8, 134.8, 135.8, 149.1, 173.8.

1.6 Compound A6

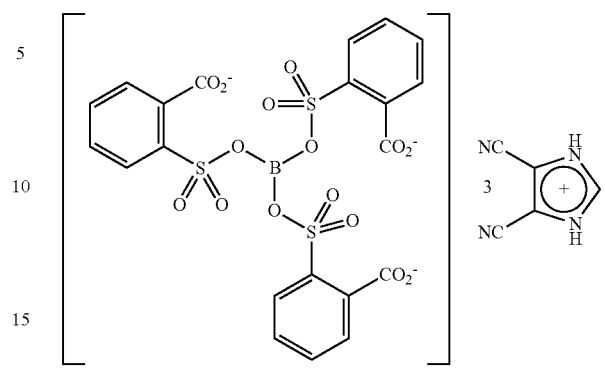

In a 100 mL round bottom flask, is introduced the boric acid (1 eq., 8.09 mmol) to which is added 70 mL of THF. After 30 minutes at room temperature, sulfobenzoic acid (3 eq., 24.26 mmol) is added. The reaction is then kept at room temperature for 3 hours. A solution of 1H-imidazole-4,5-dicarbonitrile (3 eq., 24.26 mmol) in 10 mL of THF is added. The reaction mixture, remaining as a homogeneous solution, is stirred for a period of 2 hours. THF is then evaporated and a white solid is obtained with a yield of 99% (7.790 g).

$^1$H NMR (400 MHz, DMSO-d6) δ ppm 7.46-7.58 (m, 6 H), 7.74 (s, 3 H), 7.81-7.88 (m, 3 H), 8.30-8.32 (m, 3 H); $^{13}$C NMR (101 MHz, DMSO-d6) δ ppm 111.6, 115.6, 127.1, 130.2, 131.2, 131.3, 131.5, 142.3, 144.6, 168.2.

1.7 Compound A8

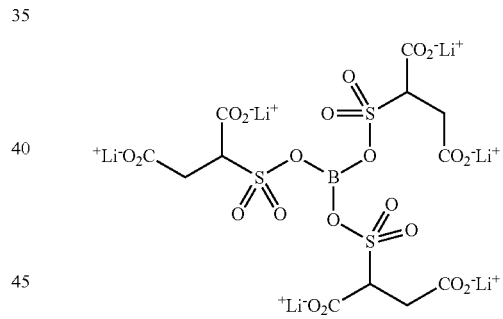

Sulfosuccinimic acid (3 eq., 10.6 mmol) and MgSO$_4$ are introduced in a 100 mL round bottom flask, and 15 mL of THF are added. After 10 minutes, the MgSO$_4$ is eliminated by filtration and rinsed with 25 mL of THF. The filtrate is recovered in a 100 mL round bottom flask. Boric acid (1 eq., 3.53 mmol) is added to the medium. After 30 minutes, a homogeneous mixture is obtained. Li$_2$CO$_3$ (3 eq., 10.6 mmol) is then added and, after 15 minutes of stirring, a precipitate is formed. After a period of 30 minutes, an intermediate product (between powder and white oil) is observed. The reaction is maintained for 20 hours at room temperature (20° C.). The medium is then filtered, and the recovered solid is pump dried for 2 hours. A white powder is obtained with a yield of 93% (2.140 g). The obtained compound is insoluble in DMSO-D$_6$ and acetonitrile but soluble in water.

$^1$H NMR (400 MHz, D$_2$O) δ ppm 2.77-2.97 (m, 6 H), 3.91-3.99 (m, 3 H); $^{11}$B NMR (128 MHz, D$_2$O) δ 19.4 ppm; $^{13}$C NMR (101 MHz, D$_2$O) δ ppm 34.9, 64.2, 172.5, 176.4.

1.8 Compound A11

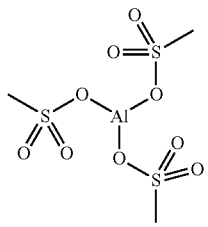

In a 100 mL round bottom flask, are introduced aluminum hydroxide (1 eq., 12.82 mmol) and 70 mL of toluene to form a heterogeneous mixture. Methanesulfonic acid (3 eq., 38.46 mmol) is then added. The reaction is maintained for 5 hours under reflux with a Dean-Stark-type apparatus to eliminate the water formed. After evaporation of the solvent and drying overnight under vacuum, a white powder is obtained with a yield of 97% (3.87 g).

$^1$H NMR (400 MHz, DMSO-d$_6$) δ ppm 2.43 (m, 9 H).

1.9 Compound A12

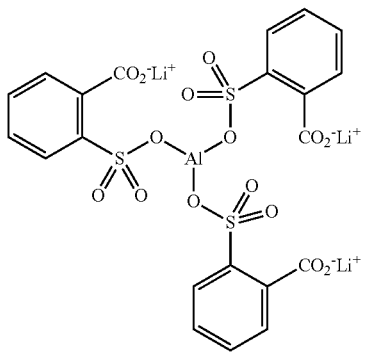

In a 100 mL round bottom flask, are introduced aluminum hydroxide (1 eq., 12.82 mmol) and 70 mL of toluene to form a heterogeneous mixture. Sulfobenzoic acid (3 eq., 38.46 mmol) and lithium carbonate (1,5 eq., 19.23 mmol) are then added. The reaction is maintained for 5 hours under reflux using a Dean-Stark-type apparatus to eliminate the water formed. After evaporation of the solvent and drying overnight under vacuum, a white powder is obtained with a yield of 97% (7.80 g).

$^1$H NMR (400 MHz, DMSO-d6) δ ppm 7.33-7.42 (m, 6 H), 7.51-7.60 (m, 3 H), 7.74-7.83 (m, 3 H).

1.10 Compound B2

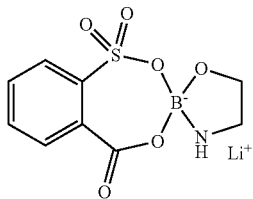 [SMILES: O=C1O[B-]2(NCCO2)OS(=O)(=O)c2ccccc21 ; [Li+]]

Sulfobenzoic acid (1 eq., 9.89 mmol), boric acid (1 eq., 9.89 mmol), and 20 mL of THF are introduced in a 100 mL round bottom flask under nitrogen atmosphere. The medium is stirred for about 15 minutes for solubilizing the solids. A solution of ethanolamine (1 eq., 9.89 mmol) in CH$_2$Cl$_2$ is then added and a white precipitate is formed. Li$_2$CO$_3$ (0.5 eq., 4.95 mmol) is then added to the medium and the reaction is maintained at room temperature (20° C.) for 5 hours. A white oily solid is then filtered and triturated with CH$_2$Cl$_2$ (2×15 mL). After drying at the pump overnight (18 h), a white solid is obtained with a quantitative yield (2.740 g).

$^1$H NMR (400 MHz, DMSO-d$_6$) δ ppm 2.85 (m, 2 H), 3.59 (m, 2 H), 7.34 (m, 2 H), 7.40 (m, 1 H), 7.76 (m, 1 H); $^{11}$B NMR (128 MHz, DMSO-d$_6$) δ ppm 1.46, 1.34; $^{13}$C NMR (101 MHz, DMSO-d$_6$) δ ppm 41.8, 58.2, 127.0, 127.5, 128.9, 129.5, 142.8, 172.8.

1.11 Compound B6

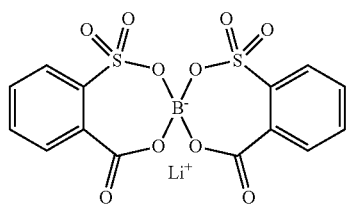 [SMILES: O=C1O[B-]2(OC(=O)c3ccccc3S(=O)(=O)O2)OS(=O)(=O)c2ccccc21 ; [Li+]]

Sulfobenzoic acid (2 eq., 4.94 mmol) previously dried over MgSO$_4$ and 20 mL of THF are introduced into a round bottom flask. Then 1 eq. of boric acid (2.97 mmol) is added, followed by 10 mL of CH$_2$Cl$_2$. Li$_2$CO$_3$ (0.5 eq., 1.48 mmol) is then added to the reaction medium, which is then maintained at room temperature (20° C.) overnight (18 h). The product obtained is very sensitive to air humidity. After filtration of the medium and evaporation of the solvent, the compound is obtained with a yield of 97% (1.2 g).

$^1$H NMR (400 MHz, DMSO-d6) δ ppm 7.47-7.58 (m, 4 H), 7.73-7.78 (m, 2 H), 7.81-7.87 (m, 2 H); $^{13}$C NMR (101 MHz, DMSO-d6) δ ppm 126.6, 129.7, 130.6, 130.9, 131.2, 144.3, 167.6.

1.12 Compound B8

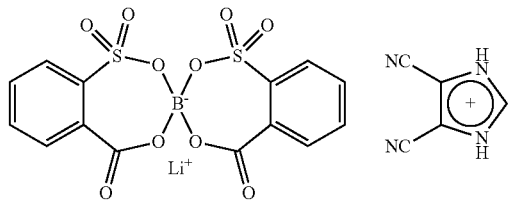

In a 100 mL round bottom flask, is introduced boric acid (1 eq., 8.09 mmol) to which is added 70 mL of THF. After 30 minutes at room temperature, sulfobenzoic acid (2 eq., 16.17 mmol) is added. The reaction is kept at room temperature for 3 hours. A solution of 1H-imidazole-4,5-dicarbonitrile (1 eq., 8.09 mmol) in 10 mL of THF is added and the mixture is stirred for 2 hours. THF is then evaporated. A white solid is obtained in a quantitative yield (4.20 g).

$^1$H NMR (400 MHz, DMSO-d6) δ ppm 7.47-7.59 (m, 4 H), 7.75 (dd, J=7.58, 1.47 Hz, 2 H), 7.84 (dd, J=7.70, 1.34 Hz, 2 H), 8.31 (s, 1 H).

1.13 Compound B10

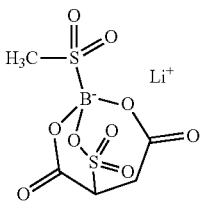 [SMILES: CS(=O)(=O)[B-]12OC(=O)CC(C(=O)O1)S(=O)(=O)O2 ; [Li+]]

Sulfosuccinimic acid (1 eq., 3.85 mmol), 20 mL of THF and MgSO$_4$ are introduced in a round bottom flask under nitrogen atmosphere. After 15 minutes, boric acid (1 eq., 3.85 mmol) is introduced. The medium is maintained at room temperature (20° C.) overnight (18 h). The medium is then filtered to remove MgSO$_4$ and the solvent is evaporated. The intermediate compound being insoluble, 10 mL of CH$_2$Cl$_2$ are added to the medium. A solution of methanesulfonic acid (1 eq., 3.85 mmol) in 5 mL of CH$_2$Cl$_2$ and 5 mL of THF is prepared and added to the medium followed by Li$_2$CO$_3$ (0.5 eq.). After reacting for 4 hours, the precipitate is filtered and then dried at the pump overnight. A white powder is obtained with a yield of 98% (1.1 g).

$^1$H NMR (400 MHz, DMSO-d$_6$) δ ppm 2.33 (s, 3 H), 2.61-2.72 (m, 1 H), 2.74-2.87 (m, 1 H), 3.59 (m, 1 H); $^{13}$C NMR (101 MHz, DMSO-d$_6$) δ ppm 33.4, 60.9, 167.0, 172.2.

1.14 Compound B11

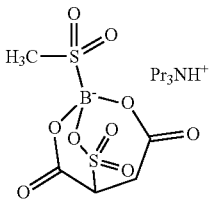

In a 250 mL round bottom flask, are introduced boric acid (1 eq.) and 70 mL of THF, and then sulfosuccinimic acid (1 eq.) and MgSO$_4$ are added. The reaction is kept at room temperature for 2 hours. MgSO$_4$ is then filtered. Methanesulfonic acid (1 eq.) is added and the reaction continues at room temperature for 2 hours. Tripropylamine (1 eq.) is then added. After a total of 6 hours of reaction, the solvent is evaporated. A solid is obtained with a yield of 97% (3.70 g).

$^1$H NMR (400 MHz, DMSO-d$_6$) δ ppm 0.91 (t, J=7.40 Hz, 9 H), 1.57-1.69 (m, 6 H), 2.42 (s, 3 H), 2.60-2.73 (m, 1 H), 2.61-2.87 (m, 1 H), 2.94-3.08 (m, 6 H), 3.59 (m, 1 H); $^{13}$C NMR (101 MHz, DMSO-d$_6$) δ ppm 11.3, 17.1, 25.6, 34.4, 40.1, 54.0, 62.1, 67.5, 170.0, 173.2

1.15 Compound B14

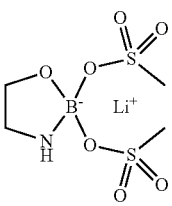

Ethanolamine (1 eq., 2.66 mmol), 20 mL of THF and boric acid (1 eq., 2.66 mmol) are successively introduced in a 100 mL round bottom flask. The mixture is kept at room temperature (20° C.) for 2 h, and the solvent is evaporated. CH$_2$Cl$_2$ (10 mL) is then added to the medium. A solution of methanesulfonic acid (2 eq., 0.33 mmol) in CH$_2$Cl$_2$ (5 mL) and THF (5 mL) is added to the mixture, followed by Li$_2$CO$_3$ (0.5 eq., 1.33 mmol). After one night (18 h), the precipitate is filtered, and pump dried overnight. A white powder is obtained in a quantitative yield (1.42 g).

$^1$H NMR (400 MHz, DMSO-d$_6$) δ ppm 2.36 (s, 6 H), 2.80-2.91 (m, 2 H), 3.53-3.66 (m, 2 H); $^{11}$B NMR (128 MHz, DMSO-d$_6$) δ ppm 5.34.

1.16 Compound B18

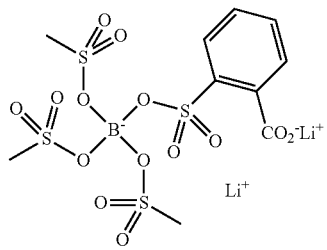

Sulfobenzoic acid (1 eq., 4.95 mmol), 20 mL of THF and MgSO$_4$ are introduced in a round bottom flask, under nitrogen atmosphere. After 15 minutes, boric acid (1 eq., 4.95 mmol) is introduced. The medium is kept at room temperature (20° C.) overnight (22 h). The medium is then filtered to eliminate MgSO$_4$ and the solvent is evaporated. The intermediate compound being insoluble, 10 mL of CH$_2$Cl$_2$ are added to the medium. A solution of methanesulfonic acid (3 eq., 14.85 mmol) in 5 mL of CH$_2$Cl$_2$ and 5 mL of THF is prepared and added to the medium, followed by Li$_2$CO$_3$ (0.5 eq.). The medium is maintained for 22 hours at room temperature (20° C.). After filtration and pump drying, a white powder is obtained in a yield of 88%.

$^1$H NMR (400 MHz, DMSO-d$_6$) δ ppm 2.32-2.37 (m, 9 H), 7.47-7.59 (m, 2 H), 7.73-7.78 (m, 1 H), 7.82-7.86 (m, 1 H); $^{11}$B NMR (128 MHz, DMSO-d$_6$) δ ppm 19.55; $^{13}$C NMR (101 MHz, DMSO-d$_6$) δ ppm 40.1, 127.0, 130.2, 131.1, 131.3, 131.6, 144.7, 168.2.

1.17 Compound B23

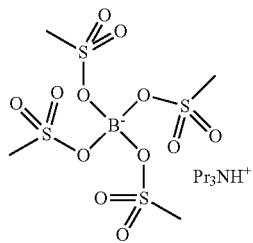 [SMILES: "Pr3NH+" ; CS(=O)(=O)O[B-](OS(C)(=O)=O)(OS(C)(=O)=O)OS(C)(=O)=O]

In a 100 mL round bottom flask, is introduced boric acid (1 eq., 5.20 mmol) to which 70 mL of THF is added. After 30 minutes at room temperature, methanesulfonic acid (4 eq., 20.81 mmol) is added. The medium is kept at room temperature for 2 hours. A solution of tripropylamine (1 eq., 5.20 mmol) in 10 mL of THF is added to the mixture, which is stirred for 2 hours. The THF is then evaporated. A slightly brown oil is obtained with a yield of 99% (2.75 g).

$^1$H NMR (400 MHz, DMSO-d$_6$) δ ppm 0.71-0.85 (m, 9 H), 1.42-1.56 (m, 6 H), 2.34 (s, 12 H), 2.70-2.96 (m, 6 H); $^{13}$C NMR (101 MHz, DMSO-d$_6$) δ ppm 11.3, 17.0, 40.1, 54.0.

1.18 Compound B25

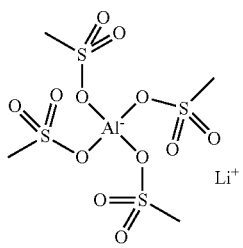

In a 100 mL round bottom flask, are introduced aluminum hydroxide (1 eq., 12.82 mmol) and 70 mL of toluene. Methanesulfonic acid (4 eq., 51.28 mmol) and lithium carbonate (0.5 eq., 6.41 mmol) are then added. The obtained mixture is heterogeneous and without observed gas evolution. The reaction is maintained for 5 hours under reflux using a Dean-Stark type apparatus. After evaporation of the solvent and drying overnight under vacuum, a white powder is obtained with a yield of 98% (5.22 g).

$^1$H NMR (400 MHz, DMSO-$d_6$) δ ppm 2.39 (s, 12 H).

1.19 Compound C2

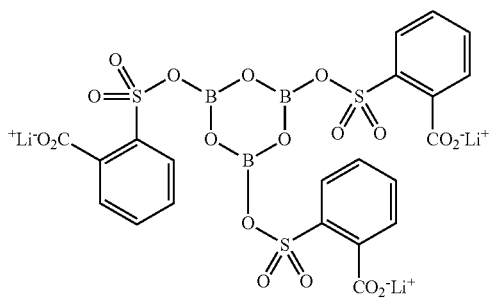

Boric acid (3 eq., 4.95 mmol), sulfobenzoic acid (3 eq., 4.95 mmol) and 60 mL of toluene are successively introduced in a 100 mL round bottom flask equipped with a Dean-Stark type apparatus. Li$_2$CO$_3$ (1.5 eq., 2.47 mmol) is then added, resulting in a gas evolution. After 30 minutes, the mixture is refluxed for 5 hours and a white precipitate forms. After returning to room temperature, the supernatant is removed by filtration and the product is dried under vacuum for 3 hours. A white powder is obtained with a yield of 96% (1.1 g).

$^1$H NMR (400 MHz, DMSO-$d_6$) δ ppm 7.46-7.57 (m, 6 H), 7.71-7.77 (m, 3 H), 7.82-7.87 (m, 3 H); $^{11}$B NMR (128 MHz, DMSO-$d_6$) δ ppm 1.41; $^{13}$C NMR (101 MHz, DMSO-$d_6$) δ ppm 127.1, 130.2, 131.1, 131.4, 144.6.

1.20 Compound C3

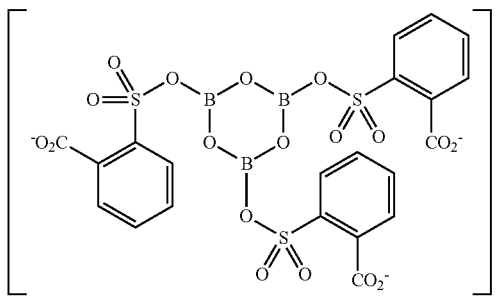

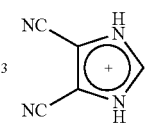

In a 100 mL round bottom flask, is introduced boric acid (3 eq., 16.17 mmol) to which is added 70 mL of toluene. After 30 min at room temperature, are added sulfobenzoic acid (3 eq., 16.17 mmol) and 1H-imidazole-4,5-dicarbonitrile (3 eq., 16.17 mmol). The assembly is then topped with a Dean-Stark type apparatus. After heating the mixture under reflux for 5 hours, the toluene is evaporated, and a white solid is obtained in a yield of 99% (5.50 g).

$^1$H NMR (400 MHz, DMSO-$d_6$) δ ppm 7.46-7.61 (m, 6 H), 7.72-7.80 (m, 3 H), 7.81-7.88 (m, 3 H), 8.32 (s, 3 H).

1.21 Compound C5

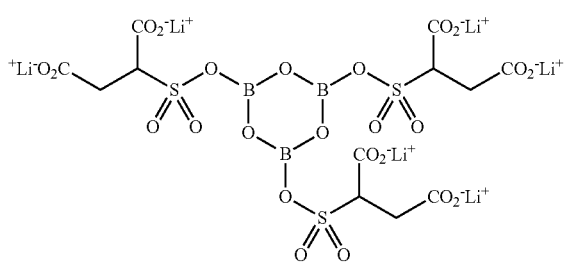

Boric acid (1 eq., 7.07 mmol), sulfosuccinimic acid (1 eq., 7.07 mmol) and 60 mL of toluene are introduced into a 100 mL round bottom flask equipped with a Dean-Stark. Li$_2$CO$_3$ (1 eq., 7.07 mmol) is then added, resulting in a gas evolution. After 30 minutes, the mixture is refluxed for 5 hours and a white precipitate is formed. After returning to room temperature, the supernatant is removed by filtration and the product is dried under vacuum for 3 hours. A powder is obtained with a yield of 92% (1.525 g).

$^1$H NMR (400 MHz, DMSO-$d_6$) δ ppm 2.62-2.72 (m, 3 H), 2.82-2.72 (m, 3 H), 3.45-3.64 (m, 3 H); $^{11}$B NMR (128 MHz, DMSO-$d_6$) δ ppm 1.39; $^{13}$C NMR (101 MHz, DMSO-$d_6$) δ ppm 35.1, 63.1, 171.5, 173.7.

1.22 Compound C7

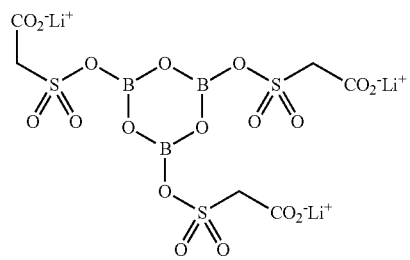

Boric acid (3 eq., 5.28 mmol), 60 mL of toluene, sulfoacetic acid (3 eq., 5.28 mmol) and Li$_2$CO$_3$ (1.5 eq., 2.64 mmol) are successively introduced into a 100 mL round bottom flask equipped with a Dean-Stark. The medium is kept at room temperature for 2 hours and then refluxed for 5 hours. After returning to room temperature, a precipitate is observed. The supernatant is removed by filtration and the product is dried under vacuum for 3 hours. A white powder is obtained in a yield of 99% (0.9 g).

$^1$H NMR (400 MHz, DMSO-d$_6$) δ ppm 3.41 (s, 6 H); $^{11}$B NMR (128 MHz, DMSO-d$_6$) δ ppm 1.40; $^{13}$C NMR (101 MHz, DMSO-d$_6$) δ ppm 57.5, 167.9.

1.23 Compound C9

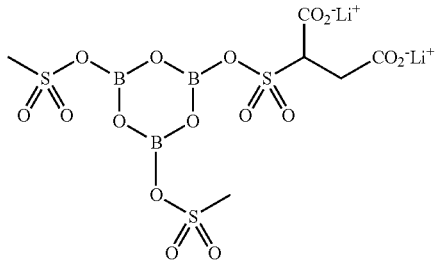

Boric acid (3 eq., 16.17 mmol) and 60 mL of toluene, and then sulfosuccinimic acid (1 eq., 5.39 mmol), methanesulfonic acid (2 eq., 10.78 mmol) and Li$_2$CO$_3$ (1 eq., 2.70 mmol) are successively introduced into a 100 mL round bottom flask equipped with a Dean-Stark. The reaction medium is kept at room temperature for 2 hours and then refluxed for 5 hours. After returning to room temperature, a precipitate is observed. The supernatant is then removed by filtration and the product is dried under vacuum for 3 hours. A white powder is obtained with a yield of 95% (2.45 g).

$^1$H NMR (400 MHz, DMSO-d$_6$) δ ppm 2.39 (s, 6 H), 2.61-2.73 (m, 1 H), 2.74-2.86 (m, 1 H), 3.54-3.67 (m, 1 H); $^{11}$B NMR (128 MHz, DMSO-d$_6$) δ ppm 2.73; $^{13}$C NMR (101 MHz, DMSO-d$_6$) δ ppm 34.5, 40.2, 62.0, 170.1, 173.3.

1.24 Compound C10

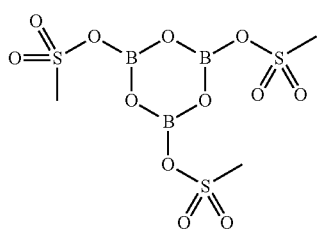 [SMILES: CS(=O)(=O)OB1OB(OS(C)(=O)=O)OB(OS(C)(=O)=O)O1]

Boric acid (1 eq., 16.17 mmol), 60 mL of toluene, and methanesulfonic acid (1 eq., 16.17 mmol) are successively introduced into a 100 mL round bottom flask equipped with a Dean-Stark. The mixture is refluxed for 5 hours. A yellow precipitate is formed. After returning to room temperature, the supernatant is removed by filtration and the product is dried under vacuum for 3 hours. A yellow solid is obtained in a yield of 81% (1.60 g).

$^1$H NMR (400 MHz, DMSO-d$_6$) δ ppm 2.46 (s, 9 H); $^{11}$B NMR (128 MHz, DMSO-d$_6$) δ ppm 2.96; $^{13}$C NMR (101 MHz, DMSO-d$_6$) δ ppm 40.2.

1.25 Compound C11

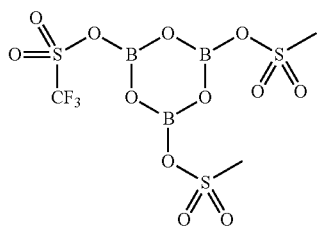 [SMILES: CS(=O)(=O)OB1OB(OS(C)(=O)=O)OB(OS(=O)(=O)C(F)(F)F)O1]

Boric acid (3 eq., 16.17 mmol), 60 mL of toluene, and then successively methanesulfonic acid (2 eq., 10.78 mmol) and triflic acid (1 eq., 5.39 mmol) are introduced into a 100 mL round bottom flask equipped with a Dean-Stark. The mixture is kept at room temperature for 2 hours and then refluxed for 5 hours. A yellow precipitate is formed. After returning to room temperature, the supernatant is removed by filtration and the product is dried under vacuum for 3 hours. A yellow solid is obtained with a yield of 88% (2.00 g).

$^1$H NMR (400 MHz, DMSO-d$_6$) δ ppm 2.52 (s, 6 H); $^{11}$B NMR (128 MHz, DMSO-d$_6$) δ ppm 2.63; $^{19}$F NMR (376 MHz, DMSO-d$_6$) δ ppm −77.81; $^{13}$C NMR (101 MHz, DMSO-d$_6$) δ ppm 40.1.

1.26 Compound C12

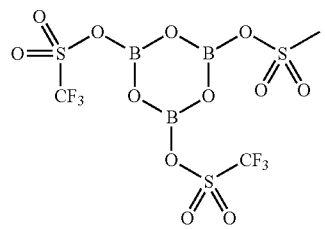 [SMILES: CS(=O)(=O)OB1OB(OS(=O)(=O)C(F)(F)F)OB(OS(=O)(=O)C(F)(F)F)O1]

Boric acid (3 eq., 16.17 mmol), 60 mL of toluene, and then successively methanesulfonic acid (1 eq., 5.39 mmol) and triflic acid (2 eq., 10.78 mmol) are introduced into a 100 mL round bottom flask equipped with a Dean-Stark. The mixture is kept at room temperature for 2 hours and then refluxed for 5 hours. After returning to room temperature, the supernatant is removed by filtration and the solid obtained is dried under vacuum for 3 hours. A yellow solid is obtained with a yield of 67% (1.70 g).

$^1$H NMR (400 MHz, DMSO-d$_6$) δ ppm 2.47 (s, 3 H); $^{11}$B NMR (128 MHz, DMSO-d$_6$) δ ppm 2.95; $^{19}$F NMR (376 MHz, DMSO-d$_6$) δ ppm −77.81; $^{13}$C NMR (101 MHz, DMSO-d$_6$) δ ppm 40.2.

1.27 Compound C13

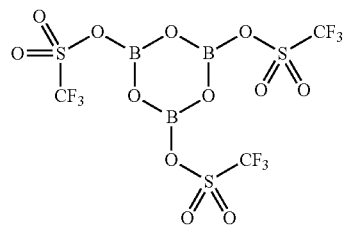 [SMILES: O=S(=O)(OB1OB(OS(=O)(=O)C(F)(F)F)OB(OS(=O)(=O)C(F)(F)F)O1)C(F)(F)F]

Boric acid (16.17 mmol), 60 mL of toluene, and triflic acid (16.17 mmol) are introduced into a 100 mL round bottom flask equipped with a Dean-Stark. The mixture is kept at room temperature for 2 hours and then refluxed for 4 hours. A yellow precipitate is formed. After returning to room temperature, the supernatant is removed by filtration and the product is dried under vacuum for 3 hours. A yellow solid is obtained with a yield of 84% (2.39 g).

$^{11}$B NMR (128 MHz, DMSO-d$_6$) δ ppm 2.96; $^{19}$F NMR (376 MHz, DMSO-d$_6$) δ ppm −77.80; $^{13}$C NMR (101 MHz, DMSO-d$_6$) δ ppm 121.1.

1.28 Compound C14

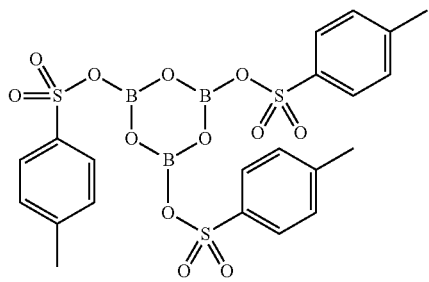 [SMILES: Cc1ccc(S(=O)(=O)OB2OB(OS(=O)(=O)c3ccc(C)cc3)OB(OS(=O)(=O)c3ccc(C)cc3)O2)cc1]

p-Toluenesulfonic acid (16.17 mmol), boric acid (16.17 mmol) and 60 mL of toluene are introduced into a 100 mL round bottom flask equipped with a Dean-Stark. The mixture is refluxed for 5 hours. A brown precipitate is formed. After returning to room temperature, the supernatant is removed by filtration and the product is dried under vacuum for 3 hours. A brown powder is obtained in a yield of 98% (3.10 g).

$^1$H NMR (400 MHz, DMSO-d$_6$) δ ppm 2.30 (s, 9 H), 7.04-7.34 (m, 6 H), 7.51 (d, J=8.07 Hz, 6 H); $^{11}$B NMR (128 MHz, DMSO-d$_6$) δ ppm 2.89; $^{13}$C NMR (101 MHz, DMSO-d$_6$) δ ppm 21.3, 125.9, 128.7, 138.7, 145.3.

1.29 Compound C15

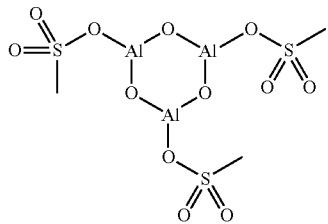

In a 100 mL round bottom flask, are introduced aluminum hydroxide (3 eq., 25.64 mmol) and 70 mL of toluene. Methanesulfonic acid (3 eq., 25.64 mmol) is then added and the reaction is maintained under reflux for 5 hours using a Dean-Stark type apparatus. After evaporating the solvent and drying overnight under vacuum, a white powder is obtained with a yield of 99% (3.50 g).

$^1$H NMR (400 MHz, DMSO-d$_6$) δ ppm 2.35 (s, 9 H).

1.30 Compound C16

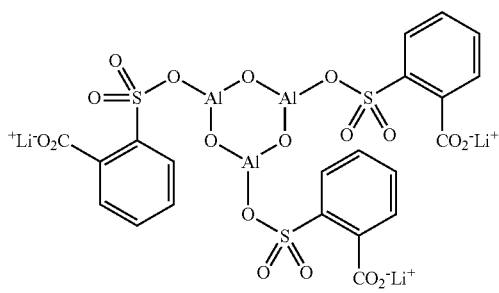

In a 100 mL round bottom flask equipped with a Dean-Stark type apparatus, are introduced aluminum hydroxide (3 eq., 25.64 mmol) and 70 mL of toluene. Sulfobenzoic acid (3 eq., 25.64 mmol) and lithium carbonate (1.5 eq., 12.82 mmol) are then added. The reaction is maintained under reflux for 5 hours. After evaporating the solvent and drying overnight under vacuum, a white powder is obtained with a yield of 97% (6.21 g).

$^1$H NMR (400 MHz, DMSO-d$_6$) δ ppm 7.38-7.48 (m, 6 H) 7.57-7.70 (m, 3 H) 7.75-7.86 (m, 3 H).

Example 2

Solubility in Polymer Matrices

The solubility of boron-containing compounds according to the present application is evaluated in polymers, the aim being to evaluate the use of a polymer as solvent (solid) for these boron-containing compounds. The solubility of some boron-based salts containing lithium is then tested. Boron salts, in that case, do not serve as an electrolyte additive but as a lithium salt. Three compounds tested (see below) were found to be soluble in the studied polymers.

The polymers used as matrix in this study (see FIG. 1) are examples of polymers usually used in polymer electrolytes. The tested polymers include a homopolymer made from polyethylene glycol acrylate macromonomers, and a copolymer of poly(ethylene glycol) (for conductivity) and polystyrene (PS, for mechanical strength). These polymers are synthesized in the laboratory by controlled radical polymerization. PAcrPEG480 (see FIG. 1b, hereinafter P.I) is a homopolymer synthesized from the AcrPEG480 macromonomer (see FIG. 1a, M$_n$=480 g/mol), whereas the PAcrPEG480-b-PS di-block copolymer (see FIG. 1c, hereinafter P.II) is synthesized from a PAcrPEG480 used here as a macroinitiator and polystyrene.

Characteristics of the polymers are determined by proton NMR spectroscopy and are listed in Table 1.

TABLE 1

Characteristics of P.I and P.II used

| | M$_n$ [a] (g/mol) | DP$_{n, PAcrPEG}$ [b] | DP$_{n, PS}$ [c] | f$_{PS}$ [d] (%) |
|---|---|---|---|---|
| P.I | 33 100 | 68 | 0 | 0 |
| P.II | 30 100 | 50 | 54 | 16 |

[a] Average molar weight by number of (co)polymer determined $^1$H NMR in CDCl$_3$
M$_n$ = [DP$_{n,PAcrPEG480}$] × M$_{AcrPEG480}$ + [DP$_{n,PS}$] × M$_{styrene}$ + M$_{initiator}$
[b] Average polymerization rate by number for the PAcrPEG480 block
[c] Average polymerization rate by number for the PS block
[d] Weight fraction of the PS block Solutions based on a polymer electrolyte are prepared in a glovebox under argon atmosphere. Before being placed in the glovebox, the polymers are freeze-dried and then dried under vacuum at 70° C. for at least 48 hours in order to eliminate all traces of water. The DMSO solvent used to prepare the polymer electrolyte solutions is anhydrous and of high purity (99.8+% under Ar) and is placed on molecular sieves. In a 5 mL vial, are introduced the polymer (P.I or P.II, see Table 1), the salt and the solvent. The mixture is allowed to stir for a minimum of 72 hours at 40° C. The weight concentration of polymer in the solution is set to about 11-12%. The amounts of polymer, salt and solvent are given in Tables 2 to 6. These amounts correspond to different ratios of ethylene oxide unit on the lithium ion: [EO]/[Li$^+$].

In the case of LiTFSI-based polymer electrolytes (comparative), the procedure to be followed differs, in particular, by the solvent used, which is THF here. The THF used is distilled beforehand over sodium and benzophenone and under inert atmosphere. It is then placed on molecular sieves before being introduced into a glovebox. Once the solutions are prepared, they are stirred at room temperature for at least 24 hours. The weight concentration of polymer is set to about 17%. The amounts of polymer, salt and solvent are given in Table 6. These amounts correspond to different ratios of ethylene oxide units relative to the lithium ion, [EO]/[Li$^+$].

TABLE 2

Polymer electrolyte solutions P.I/Compound A5

| | weight (g) | [ ] (wt %) | [EO]/[Li$^+$] |
|---|---|---|---|
| P.I | 0.138 | 11.7 | 13 |
| Compound A5 | 0.0215 | 1.8 | |
| DMSO | 1.025 | — | |
| P.I | 0.2426 | 10.9 | 29 |
| Compound A5 | 0.0169 | 0.76 | |
| DMSO | 1.97 | — | |

TABLE 3

Polymer electrolyte solutions P.I/Compound C5

| | weight (g) | [ ] (wt %) | [EO]/[Li$^+$] |
|---|---|---|---|
| P.I | 0.0203 | 11.4 | 28 |
| Compound C5 | 0.2583 | 0.9 | |
| DMSO | 1.98 | — | |

TABLE 4

Polymer electrolyte solutions P.I/Compound C2

| | weight (g) | [ ] (wt %) | [EO]/[Li$^+$] |
|---|---|---|---|
| P.I | 0.2533 | 11.1 | 31.5 |
| Compound C2 | 0.0353 | 1.54 | |
| DMSO | 2.00 | — | |

TABLE 5

Polymer electrolyte solutions P.II/Compound A5

| | weight (g) | [ ] (wt %) | [EO]/[Li$^+$] |
|---|---|---|---|
| P.II | 0.130 | 11.0 | 12.8 |
| Compound A5 | 0.0212 | 1.8 | |
| DMSO | 1.03 | — | |
| P.II | 0.251 | 11.0 | 31.9 |
| Compound A5 | 0.0135 | 0.6 | |
| DMSO | 2.02 | — | |

TABLE 6

Polymer electrolyte solutions P.I/LiTFSI

| | weight (g) | [ ] (wt %) | [EO]/[Li$^+$] |
|---|---|---|---|
| P.I | 0.2664 | 16.8 | 33 |
| LiTFSI | 0.0434 | 2.7 | |
| THF | 1.275 | — | |
| P.I | 0.2454 | 17.5 | 10 |
| LiTFSI | 0.1325 | 9.5 | |
| THF | 1.022 | — | |

The three tested boron-containing compounds A5, C2 and C5 are soluble in P.I and P.II. For comparison purposes, polymer electrolytes based on the LiTFSI salt, salt usually used in polymeric electrolytes, were also prepared in polymers P.I and P.II. The results for these are presented in Table 6.

Example 3

Preparation of Electrolyte Compositions

Compositions comprising Compounds B2, C10, C11, C12 and C13 at a concentration of 0.5 wt % were prepared in a 1 M solution of LiPF$_6$ in ethylene carbonate and diethyl carbonate (EC/DEC, 3/7 (v/v)). Compositions with a 1 M concentration of LiPF$_6$ or LiTFSI without additive in the same carbonate mixture were also prepared for comparison purposes. These electrolyte compositions are used in the following examples.

Example 4

Electrochemical Evaluation 4.1 Aluminum Corrosion Test

This test serves to verify that the electrolyte solutions comprising the present compounds do not corrode aluminum (conventional cathode current collector). The results obtained are compared to a composition comprising the LiTFSI salt, which comprises a bis(sulfonyl)imide group. Moreover, this salt is known to be corrosive to aluminum when the latter is used as a current collector.

Preparation of an Aluminum Coin Half-Cell:

In a large cell cap, the half-cell elements are arranged in the following order:

Stainless steel 0.5 mm spacer
Electrode to be tested (aluminum disk)
Separator (Celgard)
Electrolyte (200 μL)
Joint
Li metal disk
Stainless steel 1 mm spacer
Spring The half-cell is then closed using the small cell cap and fixed. The half-cell is then cleaned with ethanol to remove electrolyte overflows.

Figure 2:
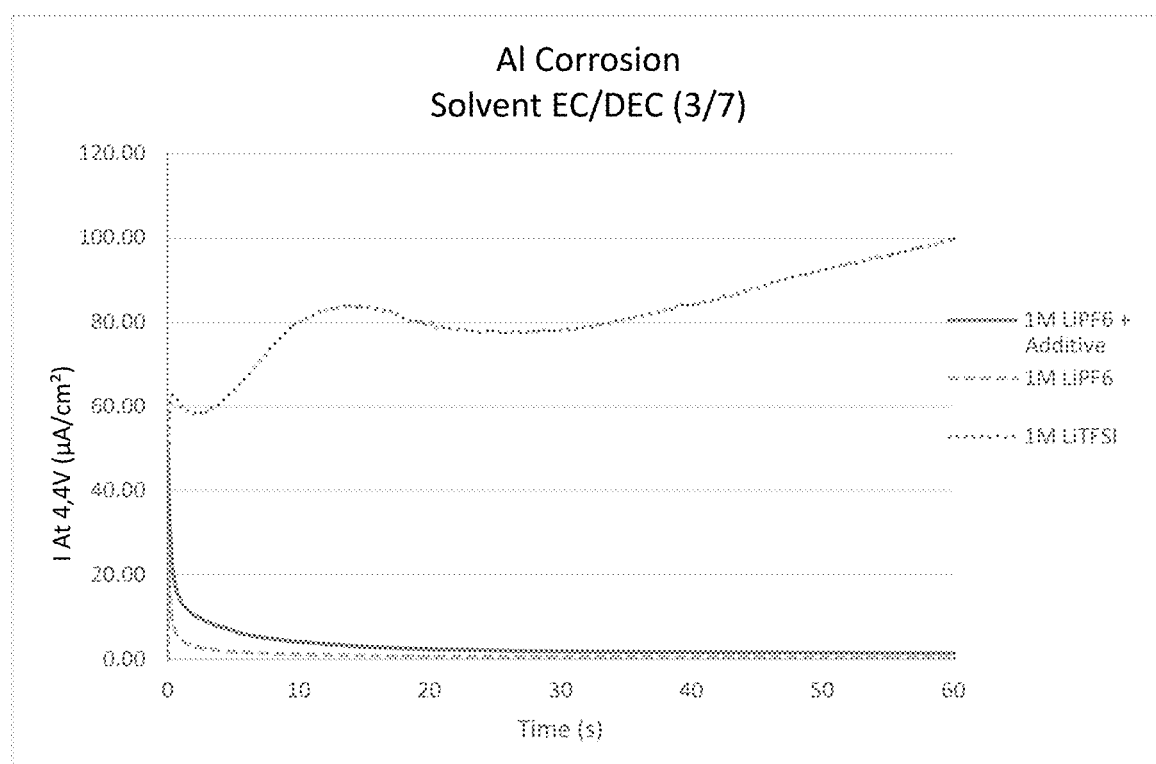
FIG. 2 illustrates the compared effect of 1 M solutions of salts in an EC/DEC mixture on the corrosion of aluminum, the cathode's current collector, curves from top to bottom: LiTFSI, $LiPF_6$, and $LiPF_6$+ additive as described in Example 4.1.

Electrochemical Tests:

The half-cell is tested using a VMP3 type cycler. In order to verify the corrosion of aluminum by the compound used as an additive, an evaluation is performed using chronoamperometry by applying a potential of 4.4 V on the coin cell for 1 hour. Results are illustrated in FIG. 2. The tested compounds are evaluated as additives to LiPF$_6$. LiPF$_6$ and LiTFSI salts are tested alone, to compare their results to those obtained with the electrolytes comprising the new synthesized additives. Indeed, it is known that LiPF$_6$ does not corrode aluminum, unlike LiTFSI. The tests carried out confirm the non-corrosion of aluminum by LiPF$_6$ and its corrosion by LiTFSI. The tests also demonstrate that the compounds tested as LiPF$_6$ additive do not corrode aluminum.

4.2 Evaluation in Half-Cells v. Lithium

In a large cell cap, the half-cell elements are arranged in the following order:

Stainless steel 0.5 mm spacer
Electrode to be tested (cathode or anode)
Separator Celgard 3501™

Electrolyte according to Example 3 (200 μL)
Joint
Li metal disk
Stainless steel 1 mm spacer
Spring The half-cell is then closed using the small cell cap and fixed. The half-cell is then cleaned with ethanol to remove electrolyte overflows. The half-cell is impregnated for 2 hours before starting the electrochemical tests.

Coin Half-Cells NMC—Li

The half-cells are assembled as above, using electrolytes prepared according to Example 3, where Compounds C10 and C13 are used as additives. For comparison purposes, a half-cell was also prepared from the electrolyte containing LiPF$_6$ without additive (see Example 3) and evaluated under the same conditions.

Figure 3:
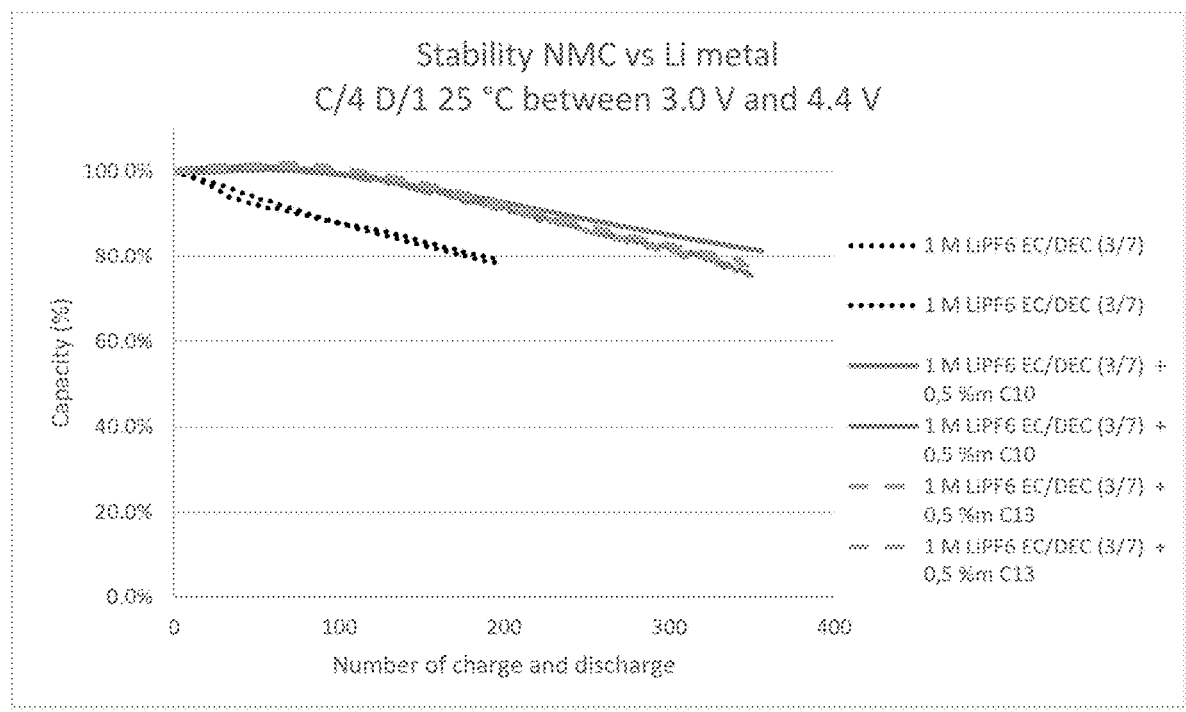
FIG. 3 shows the cycling results of half cells (recovered discharge capacity v. number of charge/discharge cycles) when using $LiPF_6$, alone (bottom curves) or in combination with compound C10 or C13 (top curves) as described in Example 4.2.

Electrodes used in the half-cells are the following:
Cathode: LiNi$_{1/3}$Mn$_{1/3}$Co$_{1/3}$O$_2$ (NMC):carbon black (Denka):VGCF-H (Showa Denko):PVDF (Kureha KF-7305™) in a weight ratio of 89:3:3:5, spreading carried out on an industrial applicator by an ink transfer type method from rollers (charge density=0.9 mAh/cm$^2$)
Anode: metallic lithium
Potential range: 3-4.4 V
Electrochemical Tests:

The half-cells are tested using a VMP$_3$™ type potentiostat/galvanostat at 25° C. (thermostatic oven). A 2-cycle formation is then carried out, where one cycle corresponds to the following description:
A charge in 24 hours (C/24) between 3 V and 4.4 V
A discharge in 24 hours (D/24) between 4.4 V and 3 V
Once the cell is formed (2 cycles) stability is launched
The following stability cycle is repeated until a 20% loss in capacity compared to that recovered at the end of the stability cycle first discharge:
A charge in 4 hours (C/4) between 3 V and 4.4 V
A rest period of 10 seconds
A discharge in 1 hour (D) between 4.4 V and 3 V
A rest period of 10 seconds The results obtained are reported in FIG. 3. If a battery's end of life is considered to be when it has lost 20% of the capacity recovered at the end of the first discharge of the stability cycle, the addition of only 0.5% of the C10 or C13 additive can improve the battery life of about 1.8 times, from about 190 cycles without additive to 340 cycles with its addition.

4.3 Evaluation in Lithium-Ion Batteries

Compounds C10 and C13 are then evaluated as additives in electrolyte compositions for use in lithium-ion batteries. LiMn$_{3/2}$Ni$_{1/2}$O$_4$ (LMN) is used as cathode active material. The anode active material is Li$_4$Ti$_5$O$_{12}$ (LTO), which is the limiting entity during the battery cycling.

The cathode comprises the following elements: LMN, carbon black, VGCF-H, and PVDF, in a weight ratio of 89:3:3:5 (charge density: 0.9 mAh/cm$^2$). The anode comprises, in the same weight ratio, elements: LTO, carbon black, VGCF-H, and PVDF (charge density: 0.95 mAh/cm$^2$).

The electrolytes used are prepared according to the procedure described in Example 3 and the separator used is a Celgard™ Q20S1HX separator with a ceramic coating. A battery using a 1M LiPF$_6$ solution without additive in EC/DEC (3:7, v/v) is also evaluated for comparison.

Figure 4:
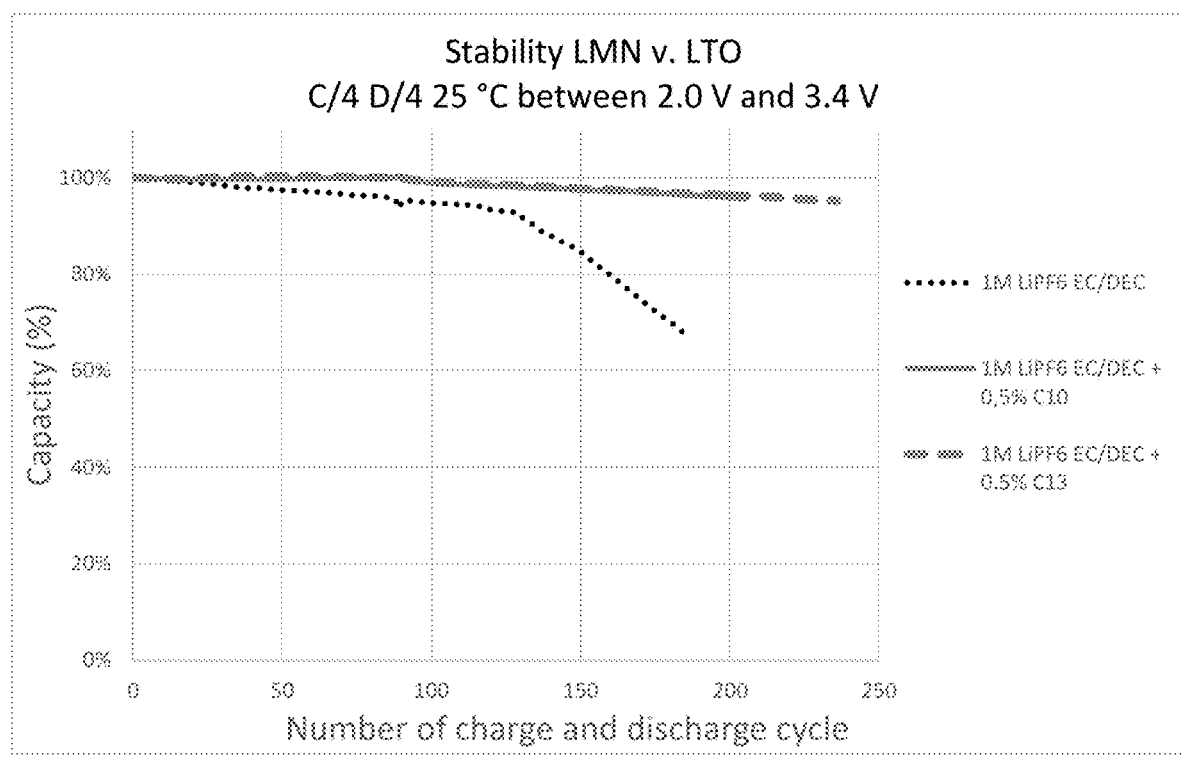
FIG. 4 shows the cycling results for cells (recovered discharge capacity v. number of charge/discharge cycles) when using $LiPF_6$, alone (bottom curves) or in combination with compound C10 or C13 (top curves) as described in Example 4.3.

The batteries are then cycled at 25° C. in a cycling range of 2 to 3.4V. Formation of the batteries is first performed in 3 C/24-C/24 cycles. Batteries stability is then tested by C/4 cycling. The results obtained are shown in FIG. 4. These results demonstrate that the addition of 0.5 wt % of additive significantly improves the life of the battery. Indeed, without additive the capacity decreases by 20% after only 160 cycles. In comparison, when an electrolyte composition comprising only 0.5% of the C10 or C13 additives in a 1 M LiPF$_6$ solution in EC/DEC (3:7) is used, a decrease in capacity of only 5% is observed after over 200 cycles.

In summary, the present application describes compounds allowing the use of high voltage cathode materials, in order to gain capacity and mass density. Indeed, a voltage of 4.4 V is considered a high voltage for an NMC cathode of the 1/3 1/3 1/3 type, usually cycled only up to 4.2 V. The quantity and choice of additive could be adjusted, optimized or adapted depending on the material used.

The optimum amount to be added for these new additives may be adjusted to further improve the life of the batteries even more significantly. For example, a very high voltage cathode material such as the LMN, also evaluated here, allowing cycling up to 4.9 V, can be used. There is therefore an interest in using these new additives in high voltage systems.

Other standard anode materials such as graphite and LTO (also evaluated here) may also be used. The present description also confirms the good compatibility of the present additives with the latter.

Numerous modifications could be made to any of the above described embodiments without departing from the scope of the present invention. Any references, patents or scientific literature documents referred to in the present application are incorporated herein by reference in their entirety for all purposes.

The invention claimed is:

1. A compound of Formula III, and/or its salts:

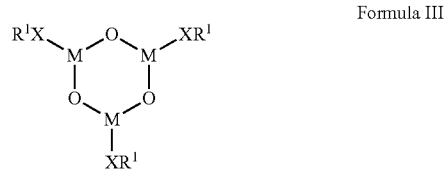

Formula III wherein:
M is an atom selected from the elements of column 13 (Group IIIA) of the periodic table of the elements;
X is independently selected from O, S, NH, NR, or a C(O)O or S(O)$_2$O group, wherein at least one X is an S(O)$_2$O group, and wherein said C(O)O or S(O)$_2$O group is attached to M by an oxygen atom;
R is independently selected from substituted or unsubstituted, linear or branched alkyl, cycloalkyl and aryl groups; and
R$^1$ is independently selected from substituted or unsubstituted, linear or branched alkyl, cycloalkyl and aryl groups.

2. The compound according to claim 1, wherein at least one X group is a C(O)O group.

3. The compound according to claim 1, wherein all X groups linked to M are S(O)$_2$O groups.

4. The compound according to claim 1, wherein M is boron or aluminum atom.

5. The compound according to claim 1, which is selected from:
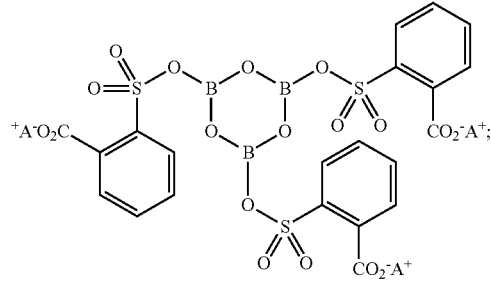
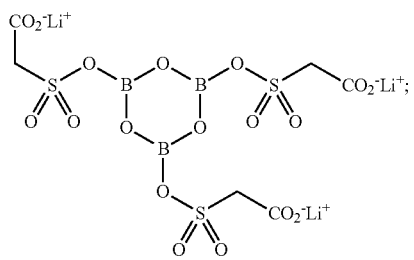
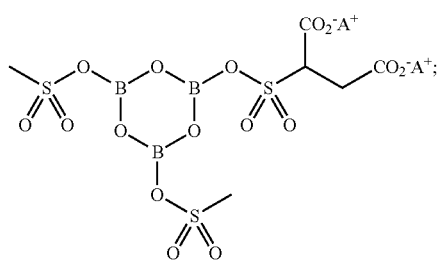
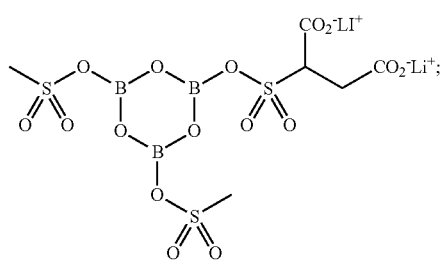
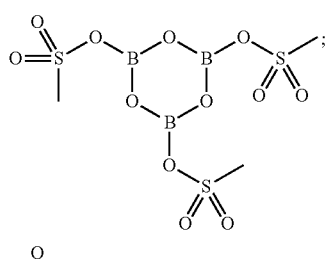
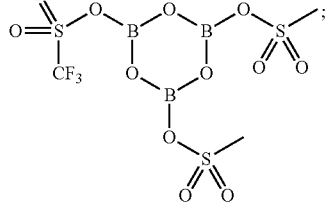
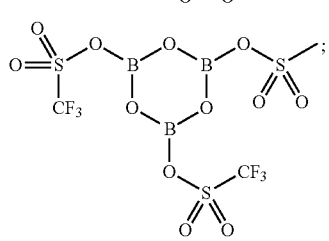
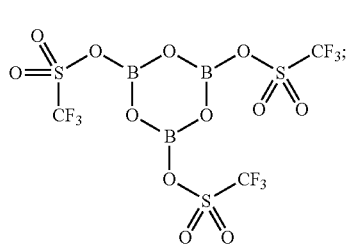

-continued

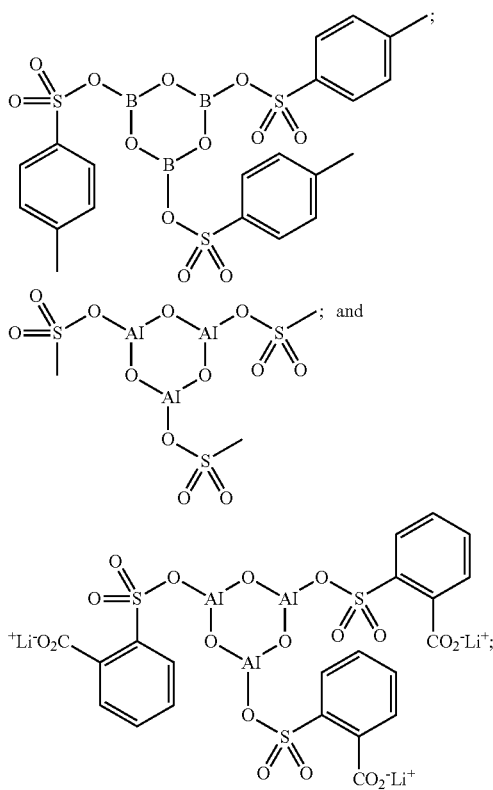

wherein A⁺ is a metallic cation or a cation of an organic base, where the total molar ratio of A⁺ relative to the rest of the molecule is adjusted to achieve electroneutrality.

6. The compound according to claim 5, wherein A⁺ is:
a metallic cation of an element selected from Li, Na, K, Rb, Cs, Be, Mg, Ca, Sr, Ba, Al, Zn, Cu, Sc, Y, Fe, Co, Ni, Ti, Sn, V, Cr, and Mn);
a cation of an alkali or alkaline earth metal (Li⁺, Na⁺, K⁺, Rb⁺, Cs⁺, Be²⁺, Mg²⁺, Ca²⁺, Sr²⁺, and Ba²⁺);
selected from ammonium, alkylammonium, dialkylammonium, trialkylammonium, tetraalkylammonium, triarylammonium, tricycloalkylammonium, tetracycloalkylammonium, imidazolium, 1,3-dialkylimidazolium, 4,5-dicyanoimidazolium, N-alkylpyrrolidinium, N-alkylpiperidinium, oxoniums, trialkyloxonium, sulfonium, trialkylsulfonium, triarylsulfonium, tricycloalkylsulfonium, phosphonium, tetraalkylphosphonium, tetraarylphosphonium, tetracycloalkylphosphonium, trialkylphosphonium, triarylphosphonium, tricycloalkylphosphonium, trialkylselenium, and tetraalkylarsonium cations; or
a cation of an organic base selected from trimethylamine, triethylamine, tripropylamine, tributylamine, N-alkylpyrrolidine, N-alkylmorpholine, N-methylimidazole, 4,5-dicyanoimidazole, pyridine, picoline, lutidine, quinoline, N,N-dimethylaniline, diisopropylethylamine, quinuclidine, and trimethylphosphine.

7. The compound of claim 5, wherein A⁺ is Li⁺.

8. Electrolyte composition comprising a compound as defined in claim 1, a liquid solvent or a solvating polymer, and optionally a salt.

9. Electrolyte composition according to claim 8, wherein the electrolyte is a liquid electrolyte, a gel polymer electrolyte or a solid polymer electrolyte.

10. Electrochemical cell comprising an electrolyte composition as defined in claim 8, between an anode and a cathode.

11. The composition of claim 8, wherein the salt is a lithium salt.

12. The composition of claim 11, wherein the lithium salt is $LiPF_6$.

13. The compound according to claim 1, wherein $R^1$ is independently selected from linear or branched alkyl, cycloalkyl and aryl groups substituted with at least one group selected from OH, $NH_2$, $N(R^2)H$, $N(R^2)_2$, C(O)OH and $SO_3H$, or a salt thereof, wherein $R^2$ is selected from optionally substituted alkyl, cycloalkyl and aryl groups.

14. The compound according to claim 13, wherein the salt is formed of a C(O)O⁻ or $SO_3^-$ anion and an A⁺ cation, wherein A⁺ is a metallic cation or a cation of an organic base, and wherein the total molar ratio of A⁺ relative to the rest of the molecule is adjusted to achieve electroneutrality.

15. The compound according to claim 14, wherein A⁺ is:
a metallic cation of an element selected from Li, Na, K, Rb, Cs, Be, Mg, Ca, Sr, Ba, Al, Zn, Cu, Sc, Y, Fe, Co, Ni, Ti, Sn, V, Cr, and Mn;
a cation of an alkali or alkaline earth metal (Li⁺, Na⁺, K⁺, Rb⁺, Cs⁺, Be²⁺, Mg²⁺, Ca²⁺, Sr²⁺, and Ba²⁺);
selected from ammonium, alkylammonium, dialkylammonium, trialkylammonium, tetraalkylammonium, triarylammonium, tricycloalkylammonium, tetracycloalkylammonium, imidazolium, 1,3-dialkylimidazolium, 4,5-dicyanoimidazolium, N-alkylpyrrolidinium, N-alkylpiperidinium, oxoniums, trialkyloxonium, sulfonium, trialkylsulfonium, triarylsulfonium, tricycloalkylsulfonium, phosphonium, tetraalkylphosphonium, tetraarylphosphonium, tetracycloalkylphosphonium, trialkylphosphonium, triarylphosphonium, tricycloalkylphosphonium, trialkylselenium, and tetraalkylarsonium cations; or
a cation of an organic base selected from trimethylamine, triethylamine, tripropylamine, tributylamine, N-alkylpyrrolidine, N-alkylmorpholine, N-methylimidazole, 4,5-dicyanoimidazole, pyridine, picoline, lutidine, quinoline, N,N-dimethylaniline, diisopropylethylamine, quinuclidine, and trimethylphosphine.

16. The compound of claim 1, wherein M is a boron, aluminum, gallium, indium or thallium atom.

17. Process for preparing a compound of Formula III according to claim 1, comprising a step of contacting a compound of Formula IV:

wherein M is as defined in claim 1 and X' is selected from hydrogen, OH, halogen, $C_1$-$C_4$alkyl, O—$C_1$-$C_4$alkyl, $C_1$-$C_4$alkylcarboxylate, sulfate, phosphate, or a salt of the compound of Formula IV;
with about 1 equivalent of at least one compound of Formula VI:

where $R^1$ and X are as defined in claim 1.

18. Process according to claim 17, wherein:
$R^1$ is an alkyl, cycloalkyl or aryl substituted with at least one group selected from OH, $NH_2$, $N(R^2)H$, $N(R^2)_2$, $CO_2H$ and $SO_3H$, or a salt thereof when applicable, where $R^2$ is selected from optionally substituted alkyl, cycloalkyl or aryl groups; or $R^1$ is an alkyl, cycloalkyl or aryl substituted with at least one group selected from $CO_2H$ and $SO_3H$ or a salt formed of a $CO_2^-$ or $SO_3^-$ anion and an $A^+$ cation, wherein $A^+$ is as previously defined.

19. Process according to claim 17, wherein at least one X group is a C(O)O group.

20. Process according to claim 19, wherein all X groups are $S(O)_2O$ group.

21. Process according to claim 17, wherein M is a boron or aluminum atom.

22. Process according to claim 17, comprising a step of eliminating water, wherein said step comprises a step of heating under reflux in the presence of a solvent forming an azeotrope with water and using a device allowing water trapping, or comprises the use of a desiccant.

23. Process according to claim 17, comprising a step of eliminating water, wherein said step of eliminating water comprises the use of a desiccant and said contacting is carried out at a temperature between −78° C. and the boiling temperature of a solvent or mixture of solvents.

24. Process according to claim 17, wherein the compound is selected from:

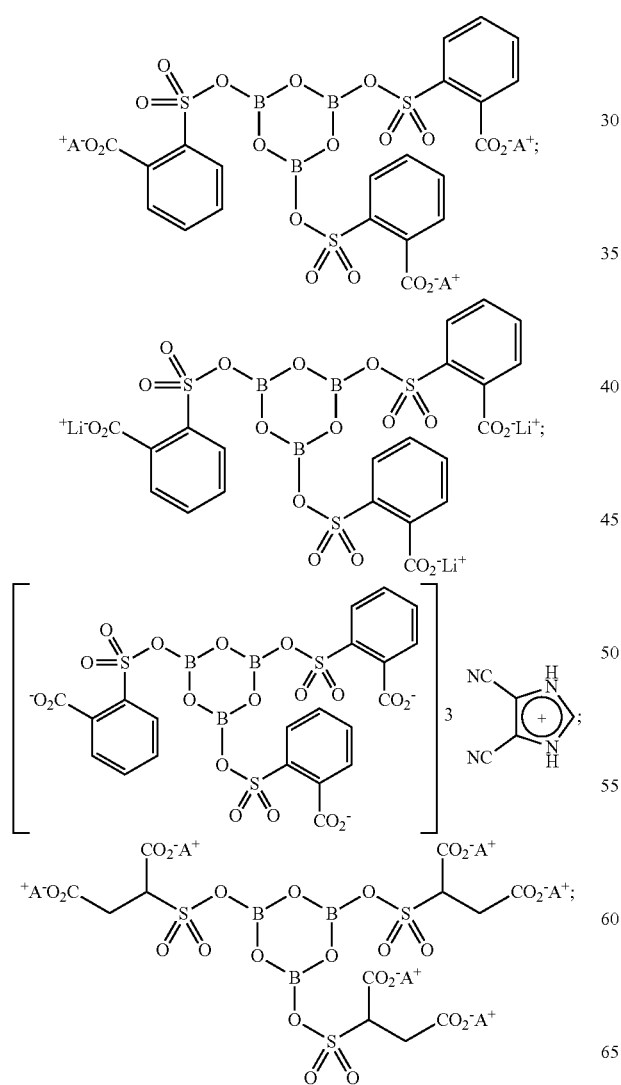

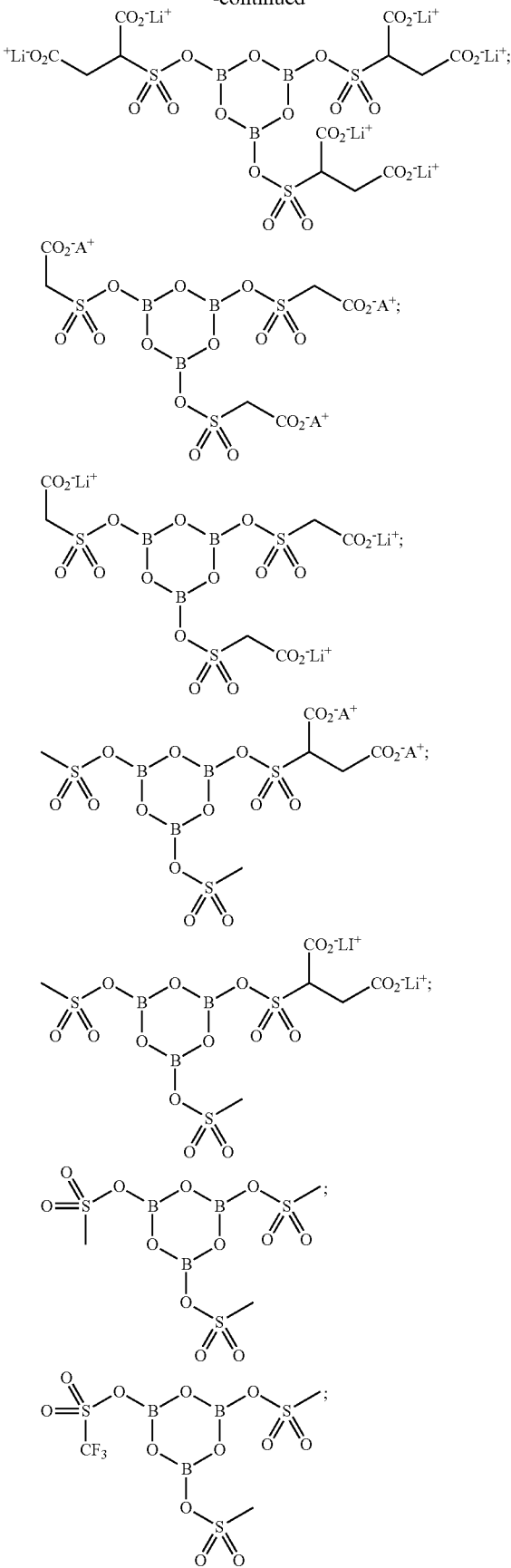

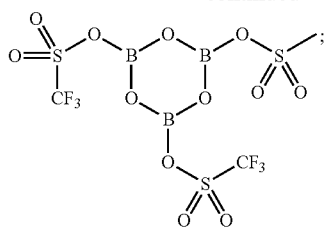

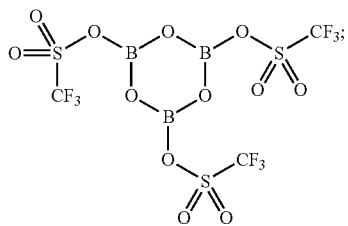

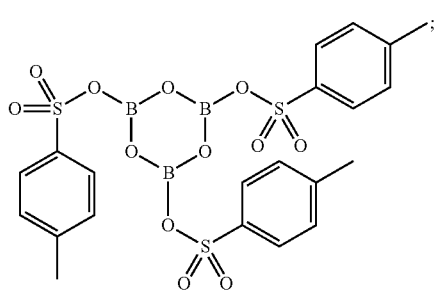

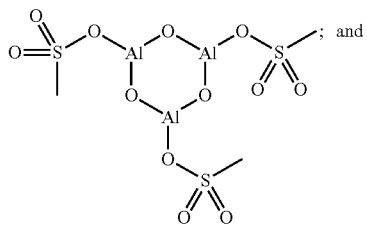

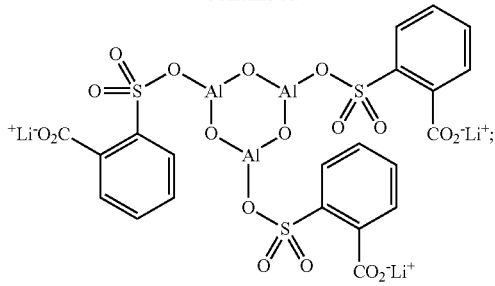

wherein $A^+$ is a metallic cation or a cation of an organic base, where the total molar ratio of $A^+$ relative to the rest of the molecule is adjusted to achieve electroneutrality.

25. The process according to claim 24, wherein, wherein $A^+$ is:
a metallic cation of an element selected from Li, Na, K, Rb, Cs, Be, Mg, Ca, Sr, Ba, Al, Zn, Cu, Sc, Y, Fe, Co, Ni, Ti, Sn, V, Cr, and Mn;
a cation of an alkali or alkaline earth metal ($Li^+$, $Na^+$, $K^+$, $Rb^+$, $Cs^+$, $Be^{2+}$, $Mg^{2+}$, $Ca^{2+}$, $Sr^{2+}$, and $Ba^{2+}$);
selected from ammonium, alkylammonium, dialkylammonium, trialkylammonium, tetraalkylammonium, triarylammonium, tricycloalkylammonium, tetracycloalkylammonium, imidazolium, 1,3-dialkylimidazolium, 4,5-dicyanoimidazolium, N-alkylpyrrolidinium, N-alkylpiperidinium, oxoniums, trialkyloxonium, sulfonium, trialkylsulfonium, triarylsulfonium, tricycloalkylsulfonium, phosphonium, tetraalkylphosphonium, tetraarylphosphonium, tetracycloalkylphosphonium, trialkylphosphonium, triarylphosphonium, tricycloalkylphosphonium, trialkylselenium, and tetraalkylarsonium cations; or
a cation of an organic base selected from trimethylamine, triethylamine, tripropylamine, tributylamine, N-alkylpyrrolidine, N-alkylmorpholine, N-methylimidazole, 4,5-dicyanoimidazole, pyridine, picoline, lutidine, quinoline, N,N-dimethylaniline, diisopropylethylamine, quinuclidine, and trimethylphosphine.

26. The process according to claim 17, wherein the compound of Formula IV is selected from $B(OH)_3$, $BH_3$, $NaBH_4$, $LiBH_4$, $BBr_3$, $BCl_3$, $BF_3$, $BMe_3$, $BEt_3$, $B(i\text{-}Pr)_3$, $B(OMe)_3$, $LiBF_4$, $Al(OH)_3$, $AlBr_3$, $AlCl_3$, $Al(OMe)_3$, $Al(OEt)_3 Al(Oi\text{-}Pr)_3$, $Al(OC(O)C_2H_5)_3$, $Al(OC(O)CH(CH_3)_2)_3$, $Al(OC(O)CH_3)_3$, $AlPO_4$, $Al_2(SO_4)_3$, $AlMe_3$, $AlEt_3$, $Al(i\text{-}Pr)_3$, $LiAlH_4$ and $LiAlCl_4$.

* * * * *